US008526529B2

(12) United States Patent
Ahn et al.

(10) Patent No.: US 8,526,529 B2
(45) Date of Patent: Sep. 3, 2013

(54) RADIO ACCESS METHOD FOR REDUCED PAPR

(75) Inventors: Joon Kui Ahn, Anyang-si (KR); Jung Hoon Lee, Anyang-si (KR); Dong Youn Seo, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 340 days.

(21) Appl. No.: 12/989,753

(22) PCT Filed: Jul. 10, 2009

(86) PCT No.: PCT/KR2009/003794
§ 371 (c)(1),
(2), (4) Date: Jan. 5, 2011

(87) PCT Pub. No.: WO2010/016662
PCT Pub. Date: Feb. 11, 2010

(65) Prior Publication Data
US 2011/0135016 A1   Jun. 9, 2011

Related U.S. Application Data

(60) Provisional application No. 61/086,466, filed on Aug. 5, 2008.

(30) Foreign Application Priority Data

Jun. 25, 2009 (KR) .......................... 10-2009-0057042

(51) Int. Cl.
*H04L 27/00* (2006.01)
*H04J 11/00* (2006.01)

(52) U.S. Cl.
USPC .......................................... 375/295; 370/210

(58) Field of Classification Search
USPC ................. 375/260, 295, 377; 370/203, 210
See application file for complete search history.

(56) References Cited

U.S. PATENT DOCUMENTS 6,791,995 B1 *   9/2004   Azenkot et al. ............... 370/436
7,916,775 B2 *   3/2011   Kim et al. ..................... 375/220

(Continued)

FOREIGN PATENT DOCUMENTS

CN          101223748 A      7/2008
WO     WO 2006/102745 A1    10/2006

(Continued)

OTHER PUBLICATIONS

Takashi Iwai et al., "System Performance of Clustered DFT-S-OFDM Considering Maximum Allowable Transmit Power," IEEE, pp. 1-5, Jun. 1-5, 2011.*

(Continued)

*Primary Examiner* — Tesfaldet Bocure
(74) *Attorney, Agent, or Firm* — McKenna Long & Aldridge, LLP

(57) ABSTRACT

A wireless communication system is disclosed. A method for performing a radio access in the wireless communication system includes dividing an available frequency band into a plurality of subbands, generating a plurality of frequency domain sequences from a plurality of data symbol sequences by independently performing a Fourier transform process in each of the subbands, independently mapping each of the frequency domain sequences to a corresponding subband, generating one or more transmission symbols by performing an inverse Fourier transform process on the plurality of frequency domain sequences mapped to the available frequency band, and transmitting the one or more transmission symbols to a receiver.

14 Claims, 21 Drawing Sheets

Clustered DFT-s-OFDMA

(56) References Cited

U.S. PATENT DOCUMENTS

| | | | |
|---|---|---|---|
| 7,944,981 B2* | 5/2011 | Classon | 375/260 |
| 8,111,731 B2* | 2/2012 | Shen et al. | 375/130 |
| 2004/0136314 A1 | 7/2004 | June et al. | |
| 2007/0014272 A1* | 1/2007 | Palanki et al. | 370/344 |
| 2007/0211807 A1* | 9/2007 | Han et al. | 375/260 |
| 2008/0049851 A1* | 2/2008 | Nangia et al. | 375/260 |
| 2008/0153425 A1* | 6/2008 | Heo et al. | 455/68 |
| 2008/0212698 A1* | 9/2008 | Kim et al. | 375/260 |
| 2008/0225791 A1* | 9/2008 | Pi et al. | 370/330 |
| 2009/0052470 A1* | 2/2009 | Yun et al. | 370/491 |
| 2009/0097465 A1* | 4/2009 | Inoue et al. | 370/342 |
| 2009/0257407 A1* | 10/2009 | Park et al. | 370/336 |
| 2009/0310589 A1* | 12/2009 | Nangia et al. | 370/344 |
| 2010/0029320 A1* | 2/2010 | Malladi et al. | 455/522 |
| 2011/0142151 A1* | 6/2011 | Zhang et al. | 375/260 |
| 2012/0269138 A1* | 10/2012 | Han et al. | 370/329 |
| 2012/0307760 A1* | 12/2012 | Han et al. | 370/329 |
| 2012/0307771 A1* | 12/2012 | Yang et al. | 370/329 |

FOREIGN PATENT DOCUMENTS

| | | |
|---|---|---|
| WO | WO 2006-135186 A2 | 12/2006 |
| WO | WO 2006/138206 A1 | 12/2006 |
| WO | WO 2008/057969 A2 | 5/2008 |

OTHER PUBLICATIONS

Ok-Sun Park et al., "Performance Analysis of Clustered DFT-Spread OFDM for LTE-Advanced Uplink MIMO," IEEE, pp. 1-5, Dec. 13-15, 2010.*

* cited by examiner

Conventional OFDMA transmitter

Conventional OFDMA receiver (a) Transmitter (b) Receiver (a) Transmitter (b) Receiver (a) Transmitter (b) Receiver Interleaved DFT-s-OFDMA Localized DFT-s-OFDMA Clustered DFT-s-OFDMA One example of hybrid Nx/ clustered DFT-s-OFDMA transmitter Another example of hybrid Nx/clustered DFT-s-OFDMA transmitter Another example of hybrid Nx/clustered DFT-s-OFDMA transmitter

RADIO ACCESS METHOD FOR REDUCED PAPR

This application claims the benefit of U.S. Provisional Application No. 61/086,466 filed on Aug. 5, 2008; Korean Patent Application No. 10-2009-0057042 filed on Jun. 25, 2009; and PCT Application No. PCT/KR2009/003794 filed on Jul. 10, 2009, all of which are incorporated by reference in their entirety herein.

TECHNICAL FIELD

The present invention relates to a wireless communication system, and more particularly to a wireless communication system for supporting at least one of Single Carrier-Frequency Division Multiple Access (SC-FDMA), Multi Carrier-Frequency Division Multiple Access (MC-FDMA), and Orthogonal Frequency Division Multiple Access (OFDMA). In particular, the present invention relates to a radio access method for reducing a Peak to Average Power Ratio (PAPR) in the wireless communication system.

BACKGROUND ART

FIGS. 1A and 1B are block diagrams illustrating a transmitter and a receiver of a conventional Orthogonal Frequency Division Multiple Access (OFDMA) system, respectively. The OFDMA system uses an orthogonal frequency division multiplexing (OFDM) scheme. The OFDM scheme divides a high rate data sequence into a plurality of low rate data sequences, and simultaneously transmits the plurality of low rate data sequences using a plurality of orthogonal subcarriers. The OFDMA implements a multiple access by providing each user with some parts of available subcarriers. In an uplink, a transmitter may be used as a part of a user equipment (UE), and a receiver may be used as a part of a base station. In a downlink, a transmitter may be used as a part of a base station, and a receiver may be used as a part of a user equipment (UE).

As shown in FIG. 1A, the OFDMA transmitter 100 includes a constellation mapping module 102, a Serial/Parallel (S/P) converter 104, a symbol to subcarrier mapping module 106, an $N_c$-point Inverse Fast Fourier Transform (IFFT) module 108, a Cyclic Prefix (CP) module 110, and a Parallel/Serial (P/S) converter 112. The aforementioned modules are disclosed only for illustrative purposes, and the OFDMA transmitter 100 may further include additional modules as necessary.

A signal processing in the OFDMA transmitter 100 will hereinafter be described in detail. Firstly, a bit stream is modulated into a data symbol sequence by the constellation mapping module 102. The bit stream is obtained from a variety of signal processing operations on a data block received from a Medium Access Control (MAC) layer. For example, a channel encoding, an interleaving, a scrambling, and the like may be applied on the data block received from the MAC layer. The data block may also be referred to as a transport block as necessary. A modulation scheme may be decided in consideration of a channel status, a buffer status, a required Quality of Service (QoS), and the like. However, the modulation scheme may further include but not limited thereto a Binary Phase Shift Keying (BPSK), a Quadrature Phase Shift Keying (QPSK), and n-Quadrature Amplitude Modulation (n-QAM). After that, a serial data symbol sequence may be converted into $N_u$ parallel data symbol sequences by the S/P converter 104. $N_u$ data symbols are mapped to $N_u$ allocated subcarriers from among all the $N_c$ subcarriers, and the $N_c-N_u$ remaining subcarriers are each padded with '0' by the symbol to subcarrier mapping module 106. Then, data symbols mapped to a frequency domain are converted into time domain sequences by the $N_c$-point IFFT module 108. After that, in order to reduce an Inter-Symbol Interference (ISI) and an Inter-Carrier Interference (ICI), the cyclic prefix module 110 generates OFDMA symbols by adding a Cyclic Prefix (CP) to the time domain sequences. By the P/S converter 112, the parallel OFDMA symbols are converted to a serial OFDMA symbol, and the serial OFDMA symbol is transmitted to the receiver after passing through necessary processes. Available subcarriers among the $N_c-N_u$ remaining subcarriers, that have been left after being used by the former UE, are allocated to the latter UE, such that the latter UE transmits data through the available subcarriers.

As shown in FIG. 1B, a receiver 120 includes a serial/parallel (S/P) converter 122, a $N_c$-point Fast Fourier transformation (Nc-point FFT) module 124, a subcarrier to symbol mapping module 126, a Parallel/Serial (P/S) converter 128, and a constellation demapping module 130. The order of signal processing steps of the receiver 120 is opposite to that of the transmitter 100.

DISCLOSURE

Technical Problem

The OFDMA scheme has a variety of preferable characteristics, for example, a high spectrum efficiency and robustness about multi-path influences, or the like. However, the worst disadvantage of the OFDMA scheme is a high Peak to Average Power Ratio (PAPR). The high PAPR is caused by the addition of the same phase of each of subcarriers. PAPR is increased in proportional to the number of subcarriers via which one UE transmits a signal, and converges into the range of about 8 dB at a reliability level of about 95%. A high PAPR is considered to be undesirable in a wireless communication system, and may deteriorate a system performance or throughput. In OFDMA symbols, a high peak power may operate in a non-linear region during a power amplifying process, or may be fixed (or clipped) to a predetermined value during such a power amplifying process. Accordingly, the high peak power may unavoidably cause not only deterioration of a signal quality but also a signal distortion, so that it may unavoidably affect channel estimation, data detection, and the like.

Accordingly, the present invention is directed to a radio access method for a reduced PAPR that substantially obviates one or more problems due to limitations and disadvantages of the related art.

An object of the present invention is to provide a radio access scheme for increasing efficiency of a power amplifier by reducing a power amplifier operation range requisite for a transmitter.

Another object of the present invention is to provide a radio access scheme for providing a good performance and reducing a PAPR of a transmission signal.

Another object of the present invention is to provide a radio access scheme for guaranteeing a flexibility of scheduling.

Technical subject matters to be realized by embodiments of the present invention are not limited to only the following technical subject matters, and other technical subject matters not mentioned in the following description may be easily appreciated by those skilled in the art to which the present invention pertains without difficulty.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for performing a radio access in a wireless communication system includes dividing an available frequency band into a plurality of subbands, generating a plurality of frequency domain sequences from a plurality of data symbol sequences by independently performing a Fourier transform process in each of the subbands, independently mapping each of the frequency domain sequences to a corresponding subband, generating one or more transmission symbols by performing an inverse Fourier transform process on the plurality of frequency domain sequences mapped to the available frequency band, and transmitting the one or more transmission symbols to a receiver.

The number of subcarriers contained in each of the subbands may be independently established, where the number of the subcarriers may be fixed or be semi-statically changed.

At least some subbands among the plurality of subbands may be logically adjacent to each other, but be physically spaced apart from each other.

The respective subbands may use different center carriers.

In this case, each of the data symbol sequences may be converted into a correspondent frequency domain sequence through an independent Fast Fourier Transformation (FFT) process. In this case, the FFT may be carried out through a Discrete Fourier Transformation (DFT) process. Preferably, a DFT size may be independently established in each subband, and may be equal to a length of a corresponding data symbol sequence. The plurality of data symbol sequences may be derived from the same data block or different data blocks.

At least one frequency domain sequence may be continuously mapped into a corresponding subband. Also, at least one frequency domain sequence may be discontinuously mapped into a corresponding subband. In this case, the at least one frequency domain sequence may be independently divided into two or more groups, and the respective groups may be continuously mapped into a corresponding subband. In this case, a distance between groups in the same subband may be independently decided. In addition, the size of each group in the same subband may be independently decided. Further, each group size may be set to a multiple of a predetermined unit.

The plurality of frequency domain sequences mapped to the available frequency band may be independently inverse-Fourier-transformed in each subband.

One or more transmission symbols may be transmitted using a plurality of radio frequency (RF) modules established in each subband.

In another aspect of the present invention, a transmitter for supporting a radio access in a wireless communication system includes a first conversion module for generating a first frequency domain sequence by performing Fourier transformation on a first data symbol sequence, a second conversion module for generating a second frequency domain sequence by performing Fourier transformation on a second data symbol sequence, a mapping module for independently mapping the first frequency domain sequence to a first subband and independently mapping the second frequency domain sequence to a second subband in an available frequency band, an inverse transformation module for generating one or more transmission symbols by performing inverse Fourier transformation on a plurality of frequency domain sequences mapped to the available frequency band, and a Radio Frequency (RF) module for transmitting the one or more transmission symbols to a receiver.

In this case, the number of subcarriers contained in the first subband and the number of subcarriers contained in the second subband may be established independent of each other. The first subband and the second subband may be logically adjacent to each other, but be physically spaced apart from each other. The first subband and the second subband may use different center carriers.

In this case, the first data symbol sequence and the second data symbol sequence may be converted into correspondent frequency domain sequences through their independent Fast Fourier Transformation (FFT) processes. In this case, the FFT may be carried out through a Discrete Fourier Transformation (DFT) process. Preferably, a DFT size may be independently established in each subband, and may be equal to a length of a corresponding data symbol sequence. In other words, the frequency domain sequences may be continuously generated in a frequency domain. The plurality of data symbol sequences may be derived from the same data block or different data blocks.

In this case, the first and/or second frequency domain sequence(s) may be continuously mapped into a corresponding subband. The first and/or second frequency domain sequence(s) may be discontinuously mapped into a corresponding subband. If the frequency domain sequences are discontinuously mapped into a corresponding subband, the frequency domain sequences may be independently divided into two or more groups, and the respective groups may be continuously mapped into a corresponding subband. In this case, a distance between groups in the same subband may be independently decided. In addition, the size of each group in the same subband may be independently decided. Further, each group size may be set to a multiple of a predetermined unit.

The plurality of frequency domain sequences mapped to the available frequency band may be independently inverse-Fourier-transformed in each of the first and second subbands.

One or more transmission symbols may be transmitted using a plurality of radio frequency (RF) modules established in each of the first and second subbands.

It is to be understood that both the foregoing general description and the following detailed description of the present invention are exemplary and explanatory and are intended to provide further explanation of the invention as claimed.

Advantageous Effects

As apparent from the above description, the present invention has the following effects.

Firstly, the present invention provides a radio access scheme capable of increasing a power amplifier's efficiency by reducing a power amplifier's operation range needed for a transmitter.

Secondly, the present invention provides a radio access scheme capable of reducing a PAPR of a transmission signal simultaneously while providing a satisfactory performance.

Thirdly, the present invention provides a radio access scheme capable of guaranteeing flexibility of scheduling. It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 2:
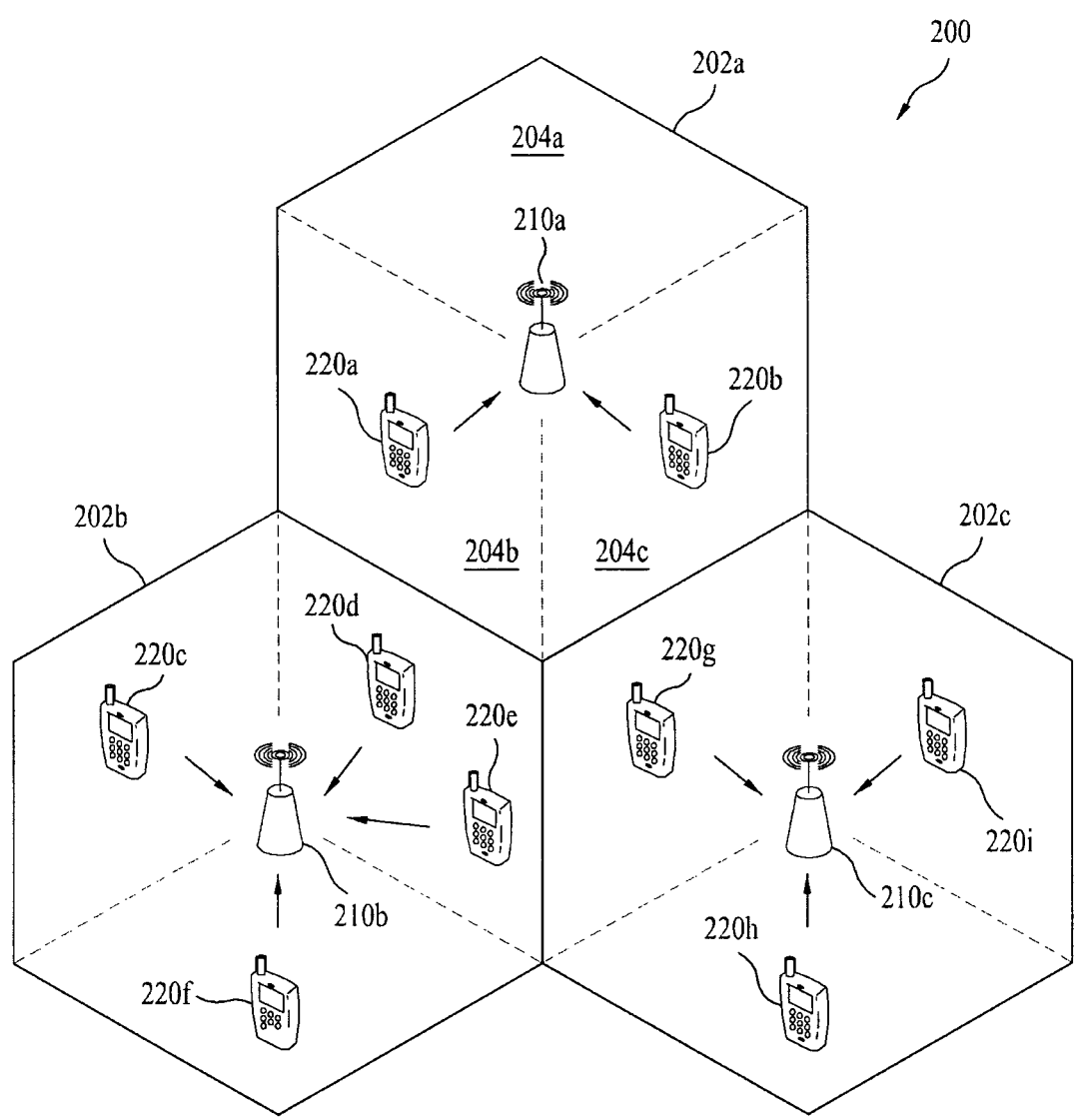
FIG. 2 exemplarily shows a wireless communication system.

FIG. 2 exemplarily shows a wireless communication system.

Referring to FIG. 2, a wireless communication system 200 includes a plurality of base stations (BSs) 210 and a plurality of user equipments (UEs) 220. Each base station is generally used as a fixed station communicating with one or more user equipments (UEs). Each base station 210 provides a specific geographical region 202 with one or more services. In order to improve a system performance, the specific region may be divided into a plurality of small-sized regions 204a, 204b, and 204c. Each small-sized region is referred to as a cell or sector, and may be provided by a Base station Transceiver Subsystem (BTS). In the 3GPP system, each division region may be referred to as a cell. The cell or sector may represent a BTS and/or a division region according to the context. The user equipments (UEs) 220 may be generally distributed in a wireless communication system, and may be fixed or movable therein. Each user equipment (UE) may communicate with one or more base stations through an uplink or a downlink at a specific moment. The uplink may be a communication link from each user equipment to each base station, and the downlink may be a communication link from each base station to each user equipment. For simplicity of description, FIG. 2 shows only uplink transmission.

Figure 3:
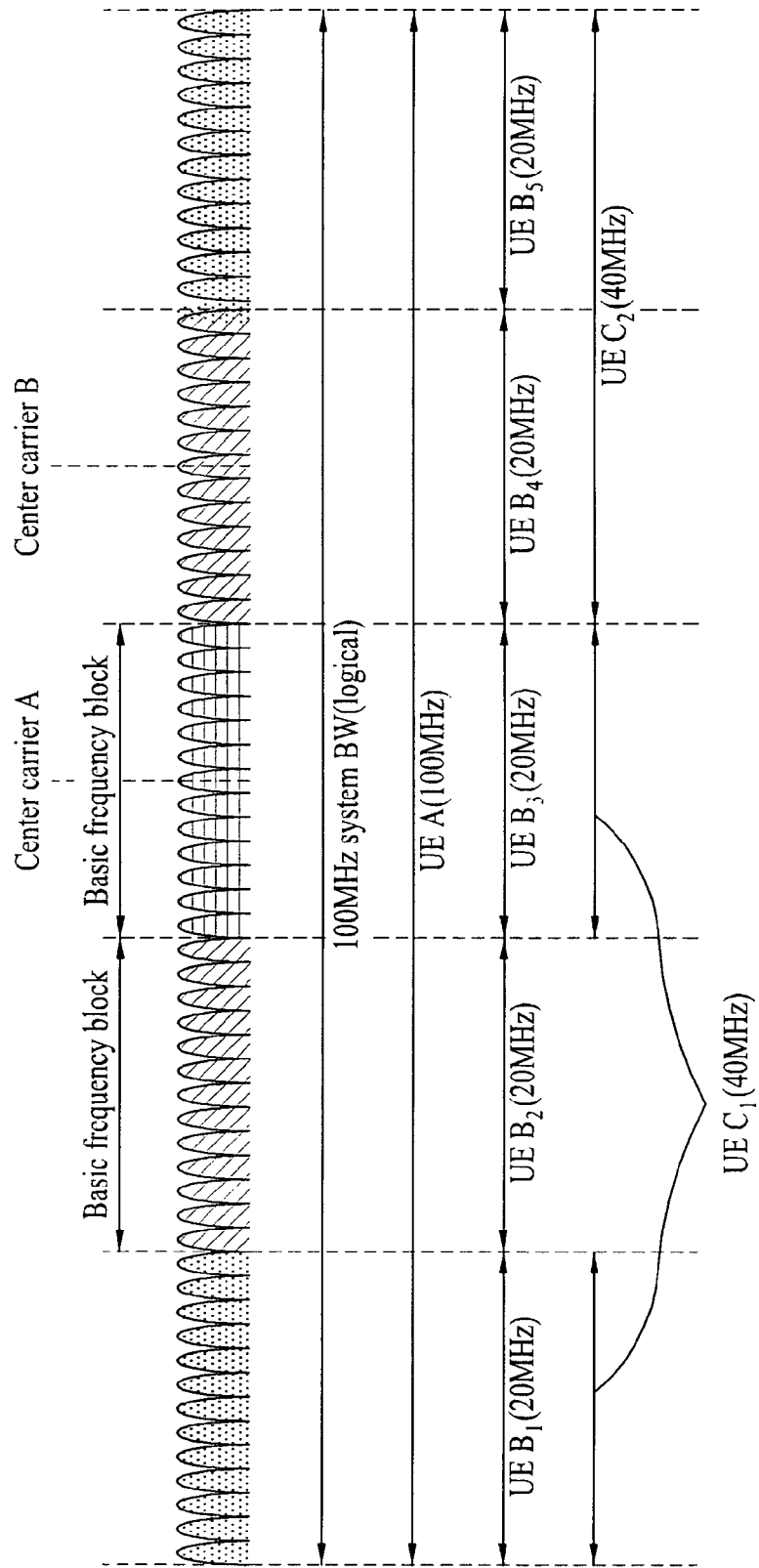
FIG. 3 exemplarily shows carrier aggregation.

FIG. 3 exemplarily shows carrier aggregation. The carrier aggregation means a method for using a plurality of frequency blocks as one large logical band so as to provide a wireless communication system with a wider frequency bandwidth.

As shown in FIG. 3, the entire system bandwidth (System BW) includes a bandwidth of 100 MHz as a logical bandwidth. The entire system bandwidth includes 5 basic frequency blocks, and has a bandwidth of 20 MHz in each basic frequency block. Each basic frequency block includes one or more consecutive subcarriers which are physically consecutive to each other. Hereinafter, the basic frequency block will hereinafter be referred to as a 'frequency block'. Although it is assumed that the frequency bands have the same bandwidth in the present invention, this assumption is disclosed only for illustrative purposes, and respective frequency blocks may have different sizes. For example, each frequency block may have any one of 1.25 MHz bandwidth, 2.5 MHz bandwidth, 5 MHz bandwidth, 10 MHz bandwidth, and 20 MHz bandwidth, or a bandwidth corresponding to a multiple of them. Although respective frequency blocks are consecutive to each other in FIG. 3, FIG. 3 is shown on the basis of only a logical concept, and respective frequency blocks may be physically consecutive or be spaced apart from each other. Different center carriers may be applied to respective frequency blocks, or one common center carrier may be applied to frequency blocks physically consecutive to each other. For example, if it is assumed that all frequency blocks are physically consecutive to each other in FIG. 3, the center carrier A may be used. For another example, if it is assumed that respective frequency blocks are not physically consecutive to each other, the respective frequency blocks may use a center carrier A, a center carrier B and the like, respectively.

When the entire system bandwidth is extended by frequency aggregation, a frequency band used for communication with each user equipment is defined on a basis of a frequency block. A user equipment A (UE A) may use a 100 MHz bandwidth indicating the entire system bandwidth, and communicates with a base station using all five frequency blocks. Each of UEs $B_1$ to $B_5$ may use only a 20 MHz bandwidth, and communicates with a base station using one frequency block. Each of UEs $C_1$ and $C_2$ may use a 40 MHz bandwidth, and communicates with a base station using two frequency blocks. The two frequency blocks may be logically or physically consecutive or not consecutive to each other. The UE $C_1$ may use two frequency blocks not consecutive to each other, and the UE $C_2$ may use two frequency blocks consecutive to each other.

Figure 4:
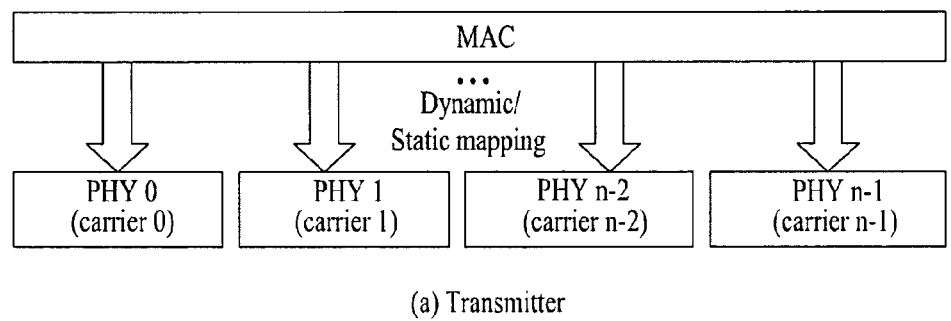
FIGS. 4 to 6 are block diagrams illustrating a transmitter and a receiver for carrier aggregation.
Figure 4:
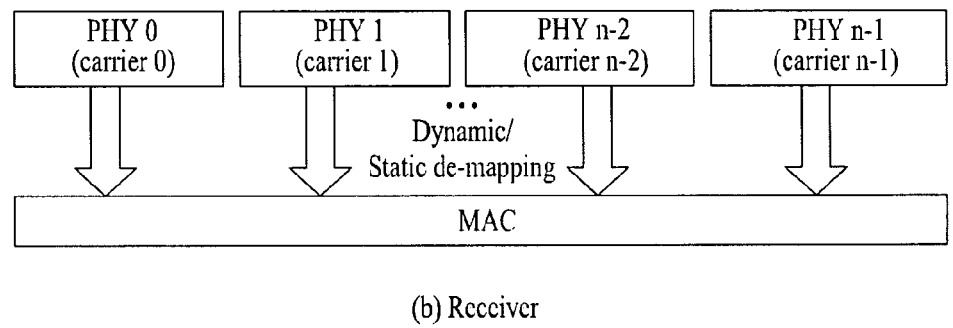
Figure 5:
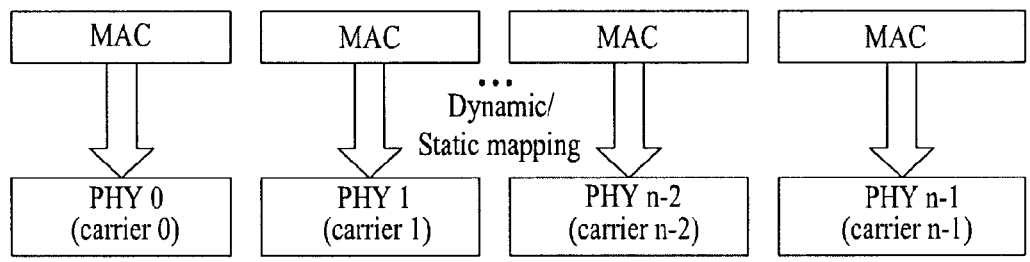
Figure 5:
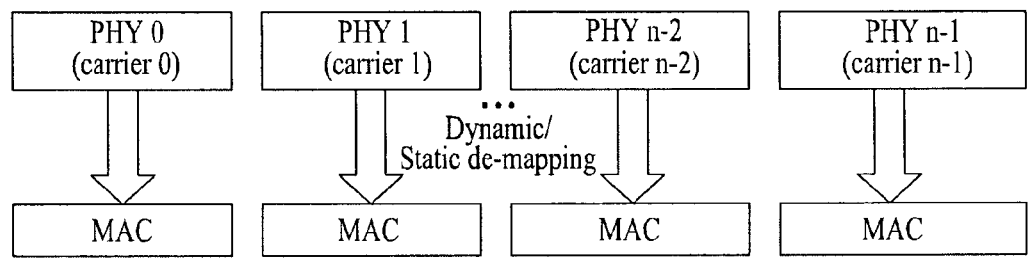
Figure 6:
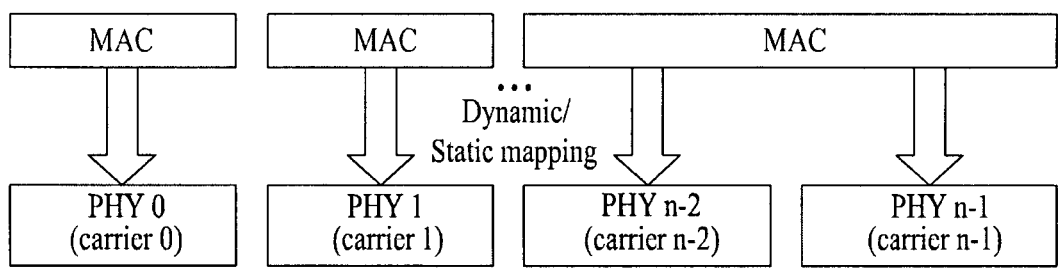
Figure 6:
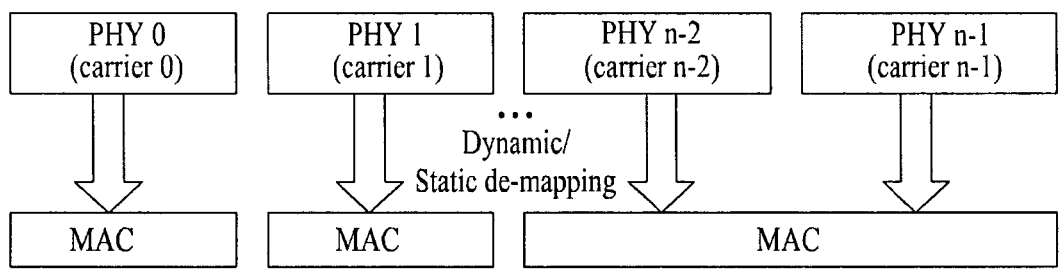

FIGS. 4 to 6 are block diagrams illustrating a transmitter and a receiver for carrier aggregation. In FIGS. 4 to 6, PHY 0, PHY 1, ..., PHY n−1 represent physical layers (PHY) of respective frequency blocks. Carrier 0, Carrier 1, Carrier n−1 each represent a center carrier. Although these figures illustrate that the respective frequency blocks use different center carriers, it should be noted that the same center carrier may also be used in a plurality of frequency blocks physically consecutive to each other.

As shown in FIG. 4, in a transmitter (a), one Medium Access Control (MAC) entity manages and operates a plurality of frequency blocks. The MAC entity means a function unit/block to be carried out in a MAC layer. In $3^{rd}$ Generation Partnership Project Long Term Evolution (3GPP LTE) system, the MAC layer is connected to a physical layer, which is a lower layer, over a transport channel, and is connected to a Radio Link Control (RLC) layer, which is an upper layer, over a logical channel. The MAC layer supports a function for mapping a variety of logical channels to a variety of transport channels, a resource scheduling, a Hybrid Automatic Repeat and reQuest (HARQ) operation, and the like. A data block transferred to the physical layer over a transport channel is referred to as a transport block. The transport block corresponds to a minimum data unit to be allocated whenever a scheduler of the MAC layer transmits data to the physical layer. For convenience of description and better understanding of the present invention, the present invention may use the term 'data block' together with another term 'transport block' as necessary. Although FIG. 4 shows that a transport block is transmitted on a basis of a frequency block for only illustrative purposes of the invention, it should be noted that such a transport block may be transferred on a basis of a plurality of frequency blocks.

As shown in FIG. 5, in a transmitter (a), one MAC entity manages and operates one frequency block. In other words, the MAC layer and the physical layer are mapped to each other on a one to one basis. As shown in FIG. 6, in a transmitter (a), a first MAC entity among a plurality of MAC entities manages and operates one frequency block, and a second MAC entity manages and operates two or more frequency blocks. That is, the transmitter illustrated in FIG. 6 manages and performs frequency aggregation using a hybrid structure of FIGS. 4 and 5. Accordingly, the MAC layer and the physical layer may have a point-to-point or point-to-multipoint mapping relationship therebetween. In FIGS. 4 to 6, a receiver (b) is configured to have another structure opposite to that of the transmitter (a).

A wireless communication system uses a variety of multiple access technologies to communicate with multiple users. As a representative multiple access technology, a Code Division Multiple Access (CDMA), a Frequency Division Multiple Access (FDMA), a Time Division Multiple Access (TDMA), an Orthogonal Frequency Division Multiple Access (OFDMA), or the like may be used. The OFDMA is generally used as the principal multiple access technology for the next generation wireless communication system, because the OFDMA is appropriate for high-rate data transmission. However, the OFDMA may cause signal quality deterioration and signal distortion. In particular, in uplink transmission in which performance and available power of a power amplifier are limited, a high PAPR may greatly affect a system performance. Accordingly, many people are discussing to a method for improving PAPR characteristics in such OFDMA.

Figure 7A:
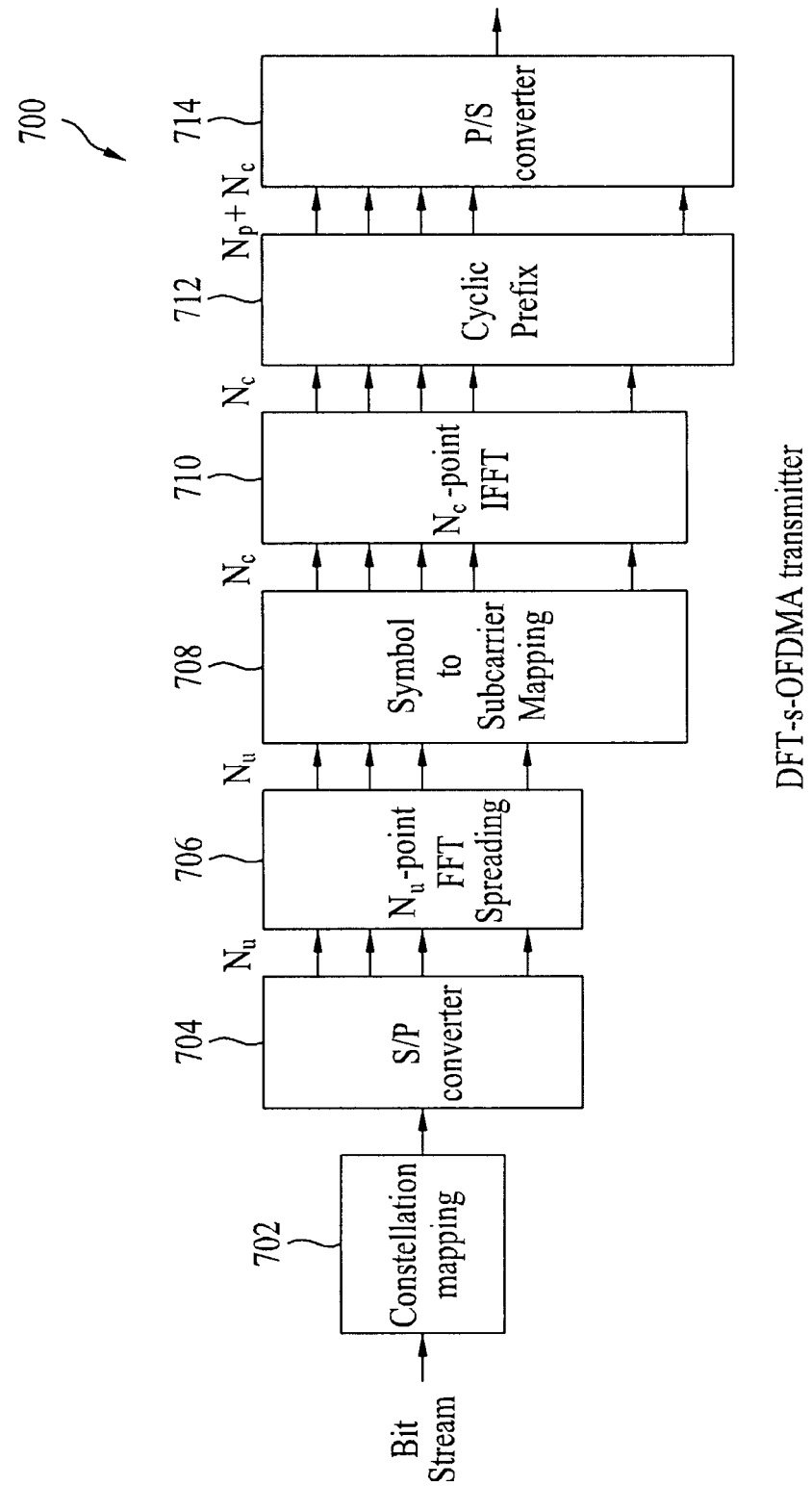
FIG. 7 is a block diagram illustrating an example of a Discrete Fourier Transformation-spread-Orthogonal Frequency Division Multiple Access (DFT-s-OFDMA) transmitter.
Figure 7B:
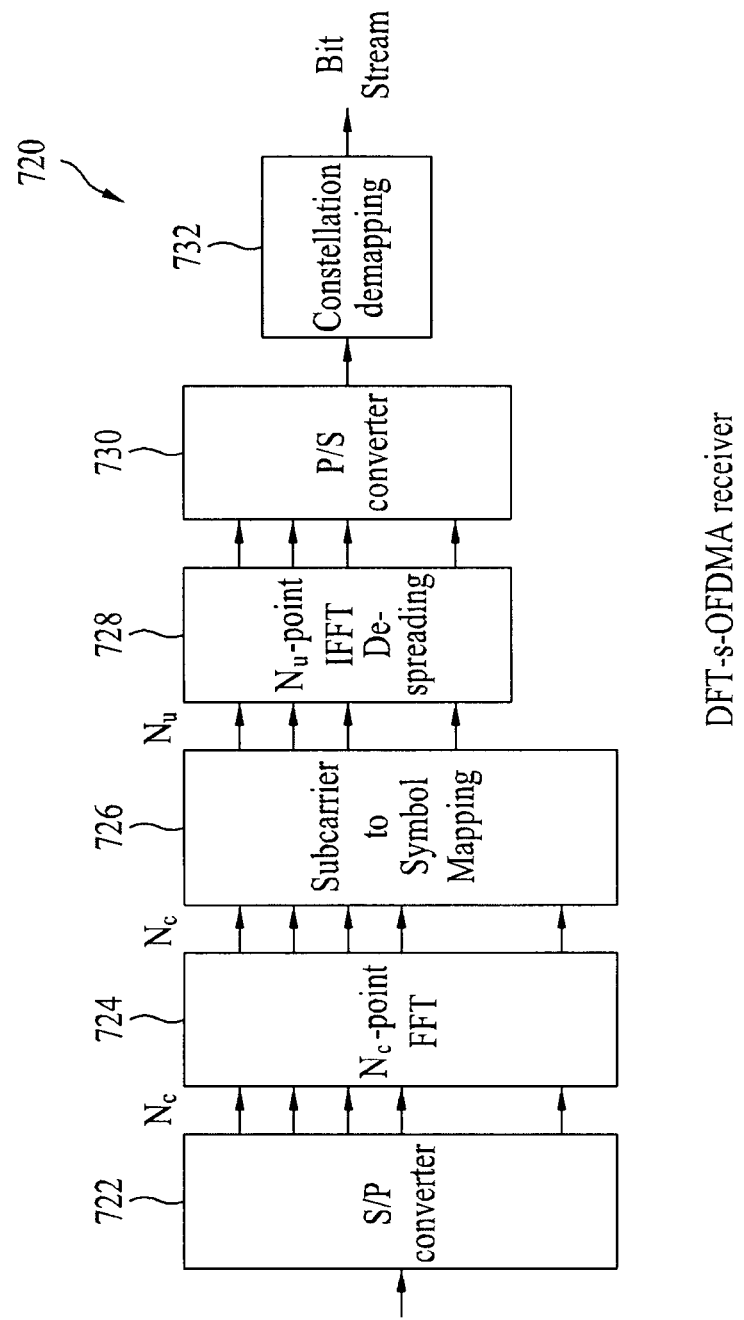

FIGS. 7A and 7B are block diagrams illustrating a Discrete Fourier Transformation-spread-Orthogonal Frequency Division Multiple Access (DFT-s-OFDMA) transmitter and a DFT-s-OFDMA receiver. The DFT-s-OFDMA scheme is different from the OFDMA scheme, because the DFT-s-OFDMA scheme spreads a plurality of data symbols (i.e., a data symbol sequence) over a frequency domain, differently from the OFDMA scheme. The DFT-s-OFDMA scheme can greatly reduce a PAPR of a transmission signal as compared to the OFDMA scheme. The DFT-s-OFDMA scheme may also be referred to as an SC-FDMA scheme. For convenience of description and better understanding of the present invention, the DFT-s-OFDMA scheme and the SC-FDMA may be used together as necessary.

As shown in FIG. 7A, a DFT-s-OFDMA transmitter 700 includes a constellation mapping module 702, a Serial/Parallel (S/P) converter 704, a $N_u$-point FFT spreading module 706, a symbol to subcarrier mapping module 708, an $N_c$-point IFFT module 710, a cyclic prefix module 712, and a Parallel/Serial (P/S) converter 714. The above-mentioned modules are disclosed only for illustrative purposes, and the DFT-s-OFDMA transmitter 700 may further include additional modules. If necessary, some modules among the above-mentioned modules may be integrated in one function, so that the some modules may also be integrated in one module. In this case, $N_u$ is an FFT spreading module input size, and means the number of scheduled subcarriers. $N_c$ means the total number of subcarriers existing in the system bandwidth (system BW). Accordingly, an $N_u$ value and its associated DFT Input/Output (I/O) size may be variable within the range of $N_u \leq N_c$ according to the amount of data symbols scheduled at each scheduling time.

Figure 1A:
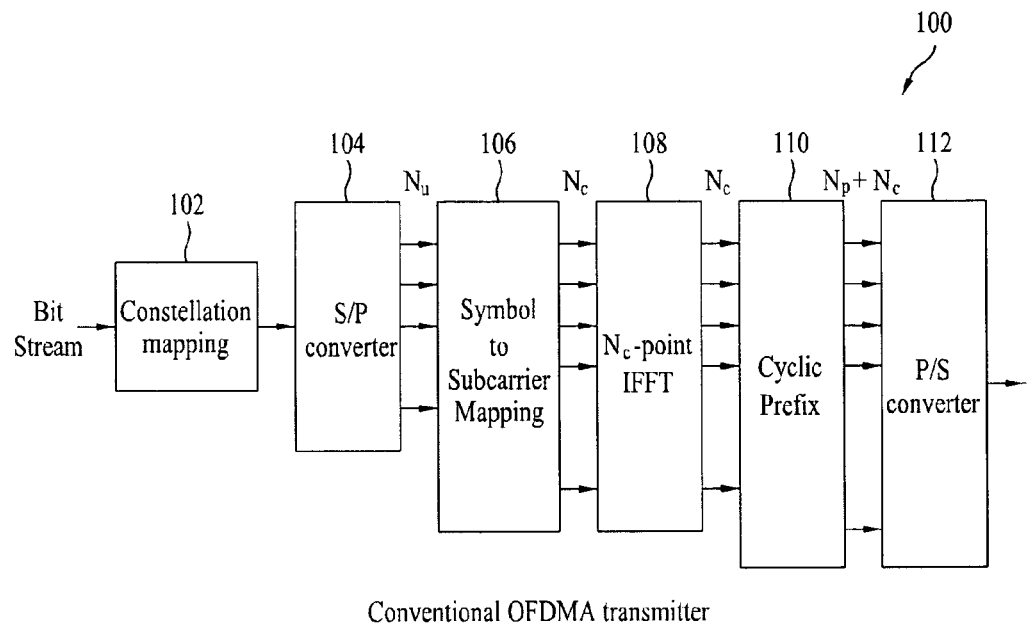
FIGS. 1A and 1B are block diagrams illustrating a transmitter and a receiver of a conventional OFDMA system, respectively.
Figure 1B:
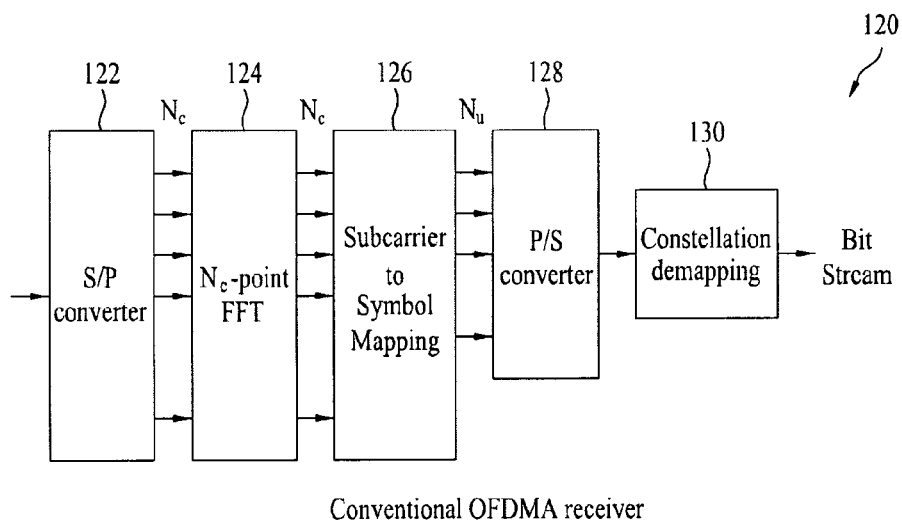

A signal processing step for the DFT-s-OFDMA transmitter 700 will hereinafter be described in detail. Firstly, a bit stream is modulated into a data symbol sequence by the constellation mapping module 702. Detailed descriptions of a bit stream, a data symbol sequence, a modulation scheme and the like may refer to those of FIG. 1 as necessary. After that, a serial data symbol sequence is converted into $N_u$ parallel data symbol sequences by the S/P converter 704. The $N_u$-length parallel data symbol sequences are converted into $N_u$-length frequency domain sequences through the same-sized FFT processing by the $N_u$-point FFT spreading module 706. The $N_u$-point FFT spreading module 706 performs signal processing using the same FFT size as that of the data symbol sequence, so that the data symbol sequence is converted into consecutive sequences in a frequency domain. The FFT process may be carried out by the $N_u$-point DFT processing. In the embodiments of the present invention, FFT and DFT may be used together as necessary, and a DFT process may be used together with a DFT spreading or a DFT precoding. After that, the $N_u$-length frequency domain sequences are mapped to $N_u$ subcarriers allocated from among a total of $N_c$ subcarriers, and the $N_c-N_u$ remaining subcarriers are each padded with '0' by the symbol to subcarrier mapping module 708. Sequences mapped to $N_c$ subcarriers are converted into $N_c$-length time domain sequences by the $N_c$-point IFFT module 710. In order to reduce an Inter-Symbol Interference (ISI) and an Inter-Carrier Interference (ICI), the last $N_p$ samples from among time domain sequences are copied and patched to the front of the time domain sequences so as to configure a cyclic prefix (CP) by the cyclic prefix module 712. The generated time domain sequences may correspond to one transmission symbol, and may be converted into a serial sequence by the P/S converter 714. After that, the serial sequence is transmitted to a receiver through frequency up-conversion or the like. Another UE (i.e., the latter UE) receives an allocation to available subcarriers from among the $N_c$–$N_u$ remaining subcarriers that have been left after being used by the former UE, so that the latter UE transmits data using the allocated available subcarriers.

Detailed steps related to the DFT precoding will hereinafter be described with reference to the following equations. Data symbol sequences applied to the DFT spreading module may be represented by $d(O), \ldots, d(M_{symb}-1)$. Each data symbol may be represented by a real number or a complex number according to a modulation scheme. The DFT spreading module processes $N_u$ data symbols at one time, so that a data symbol sequence is divided into $M_{symb}/N_u$ sets. Each of $M_{symb}/N_u$ sets may finally configure a DFT-s-OFDMA symbol. Data symbols applied to the DFT spreading module can be processed by the following equation 1.

$$D(l \cdot N_u + k) = \frac{1}{\sqrt{N_u}} \sum_{i=0}^{N_u-1} d(l \cdot N_u + i) e^{-j\frac{2\pi \cdot i \cdot k}{N_u}} \quad \text{[Equation 1]}$$

$$k = 0, \ldots, N_u - 1$$

$$l = 0, \ldots, M_{symb}/N_u - 1$$

By the DFT precoding, frequency domain sequences denoted by $D(O), \ldots, D(M_{symb}-1)$ are generated. Respective values of the frequency domain sequences decide the size and phase of mapped subcarriers. $N_u$ indicating the amplitude of the DFT spreading module is equal to the number of scheduled subcarriers. In order to make such a DFT operation easier, the following restriction may be given to $N_u$.

$$N_u = 2^{\alpha_2} \cdot 3^{\alpha_3} \cdot 5^{\alpha_5} \quad \text{[Equation 2]}$$

In Equation 2, $\alpha_2$, $\alpha_3$, or $\alpha_5$ is an integer number equal to or higher than '0'.

As shown in FIG. 7B, a receiver 720 includes an S/P converter 722, an Nc-point FFT module 724, a subcarrier to symbol mapping module 726, an $N_u$-point IFFT despreading module 728, a P/S converter 730, and a constellation mapping module 732. The signal processing steps of the receiver 720 are arranged in opposite order of those of the transmitter 700 and as such a detailed description thereof will be described by referring to FIG. 7A.

The DFT-s-OFDMA scheme is divided into a plurality of subdivision DFT-s-OFDMA schemes according to methods for mapping frequency domain sequences generated by the DFT precoding to subcarriers. For example, an interleaved DFT-s-OFDMA scheme, a localized DFT-s-OFDMA scheme, a clustered DFT-s-OFDMA scheme, and the like may be used as such subdivision DFT-s-OFDMA schemes and as such a detailed description thereof will hereinafter be described on the basis of a subcarrier mapping scheme.

Figure 8:
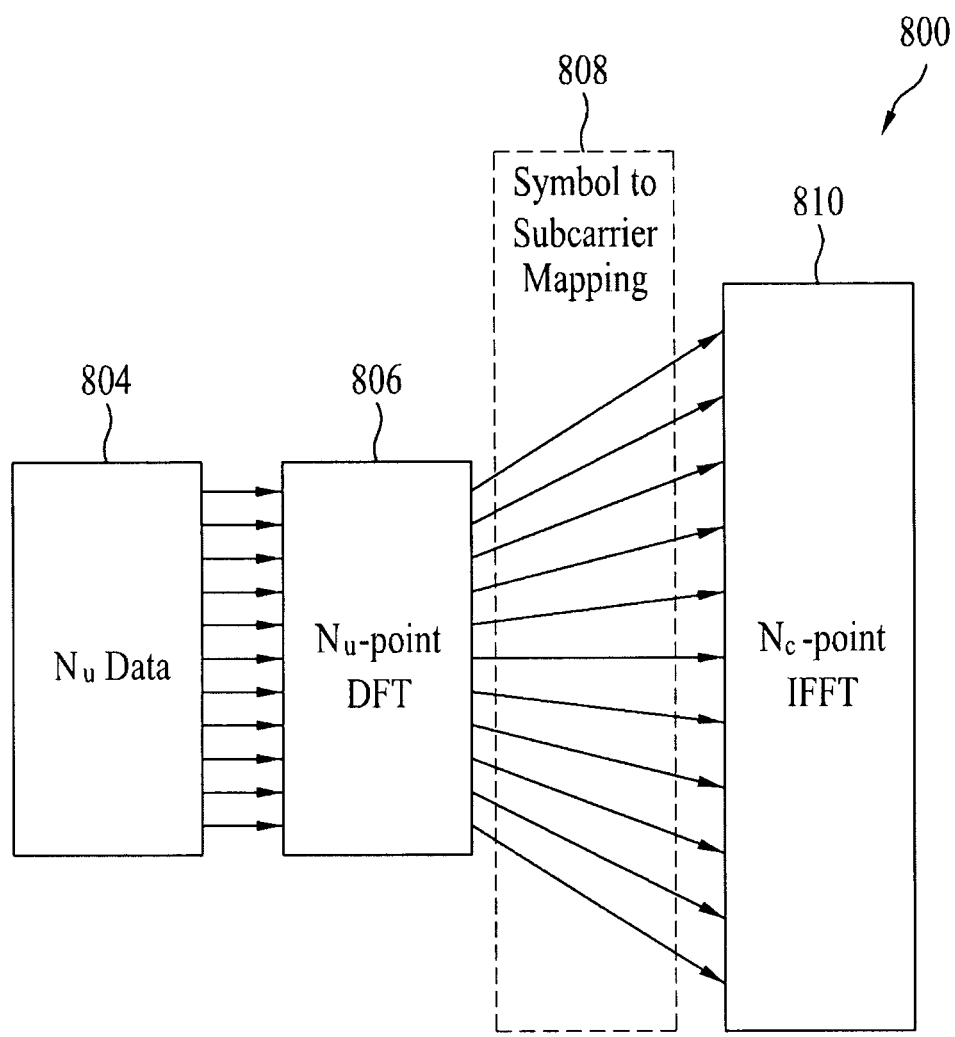
FIG. 8 is a block diagram illustrating an example of an interleaved DFT-s-OFDMA transmitter.

FIG. 8 is a block diagram illustrating an example of an interleaved DFT-s-OFDMA transmitter. If necessary, the interleaved DFT-s-OFDMA scheme illustrated in FIG. 8 may also be referred to as an Interleaved FDMA (IFDMA) or a Distributed FDMA (DFDMA). For convenience of description, it is assumed that the transmitter 800 of FIG. 8 includes a Serial/Parallel (S/P) converter 804, an $N_u$-point DFT module 806, a symbol to subcarrier mapping module 808, and an $N_c$-point IFFT module 810. Herein, $N_u$ is the number of scheduled subcarriers, and $N_c$ is the total number of subcarriers contained in a system bandwidth (system BW). Referring to FIG. 8, frequency domain sequences generated from the DFT module 806 are mapped to subcarriers contained in the system bandwidth at intervals of the same distance by the symbol to subcarrier mapping module 808. The interleaved DFT-s-OFDMA scheme illustrated in FIG. 8 can greatly reduce a PAPR of a transmission signal as compared to the OFDMA scheme. According to the interleaved DFT-s-OFDMA scheme of FIG. 8, because data symbols processed by the DFT scheme are evenly distributed throughout the entire system bandwidth, the interleaved DFT-s-OFDMA scheme of FIG. 8 can obtain a frequency diversity gain while transmitting or receiving data. However, it is impossible for the scheme of FIG. 8 to use a frequency selective scheduling capable of obtaining a performance gain by transmitting and/or receiving data through a specific frequency bandwidth having good radio channel response characteristics. In addition, because the scheme of FIG. 8 needs to perform channel estimation about the entire system bandwidth, this scheme of FIG. 8 may be far from efficiency when there are a small amount of scheduled resources.

Figure 9:
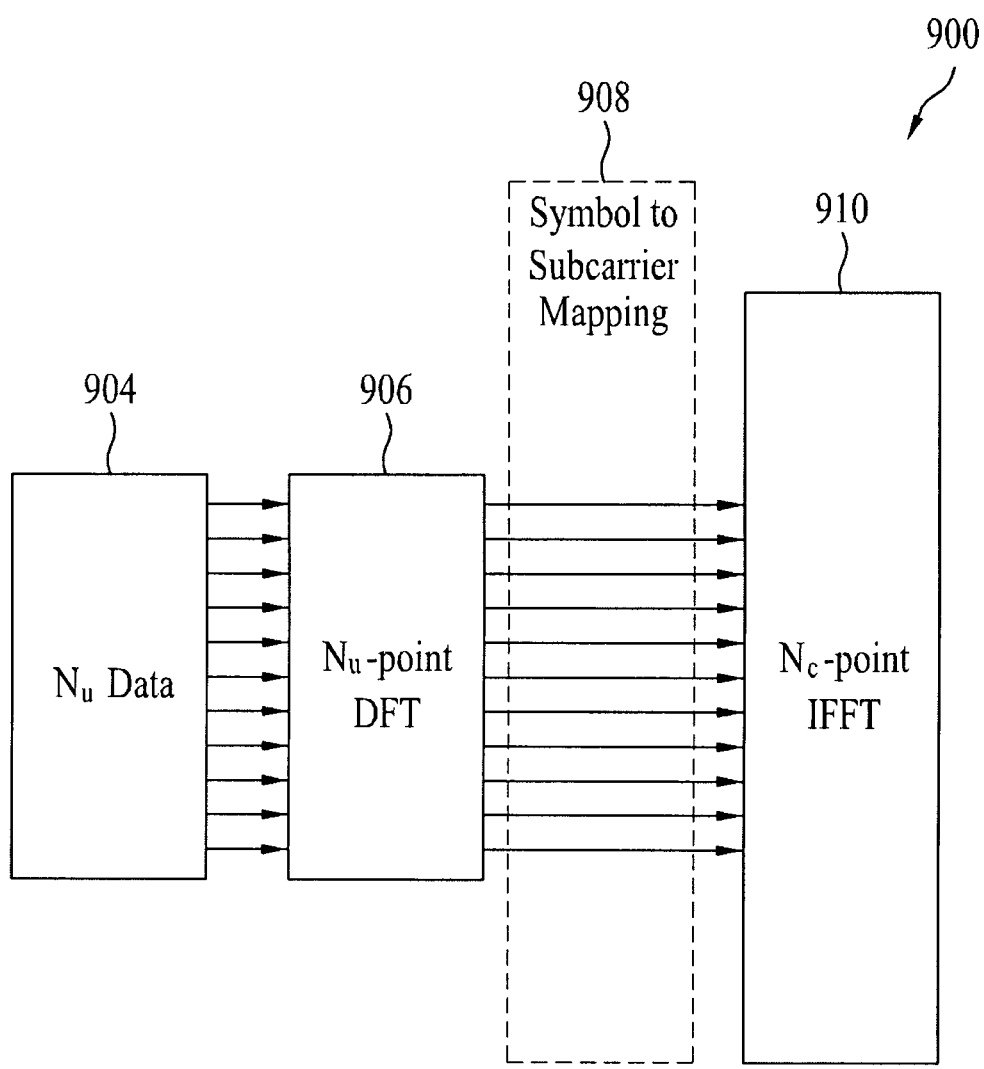
FIG. 9 is a block diagram illustrating an example of a localized DFT-s-OFDMA transmitter.

FIG. 9 is a block diagram illustrating an example of a localized DFT-s-OFDMA transmitter. If necessary, the localized DFT-s-OFDMA scheme of FIG. 9 may also be referred to as a localized FDMA (LFDMA), a Narrowband FDMA (NFDMA), a Classical FDMA (CFDMA), or an FDMA. For convenience of description, it is assumed that the transmitter 900 of FIG. 9 includes a Serial/Parallel (S/P) converter 904, an $N_u$-point DFT module 906, a symbol to subcarrier mapping module 908, and an $N_c$-point IFFT module 910. Herein, $N_u$ is the number of scheduled subcarriers, and $N_c$ is the total number of subcarriers contained in a system bandwidth (system BW). Referring to FIG. 9, frequency domain sequences generated from the DFT module 906 are mapped to consecutive subcarriers contained in the system bandwidth. In other words, frequency domain sequences having the length of $N_u$ are mapped to $N_u$ consecutive subcarriers. The localized DFT-s-OFDMA scheme of FIG. 9 still has a lower PAPR as compared to the OFDMA scheme. In addition, the localized DFT-s-OFDMA scheme of FIG. 9 can perform frequency selective scheduling simultaneously while obtaining a PAPR gain based on the DFT-s-OFDMA scheme. However, the localized DFT-s-OFDMA scheme can transmit data through only consecutive subcarriers at a given time, so that flexibility of scheduling may be unavoidably deteriorated. For example, when a transmitter and a receiver have good radio channel response characteristics in a plurality of frequency domains spaced apart from each other at a certain time, it is impossible for the localized DFT-s-OFDMA scheme of FIG. 9 to simultaneously transmit data to the plurality of frequency domains spaced apart from each other.

Figure 10:
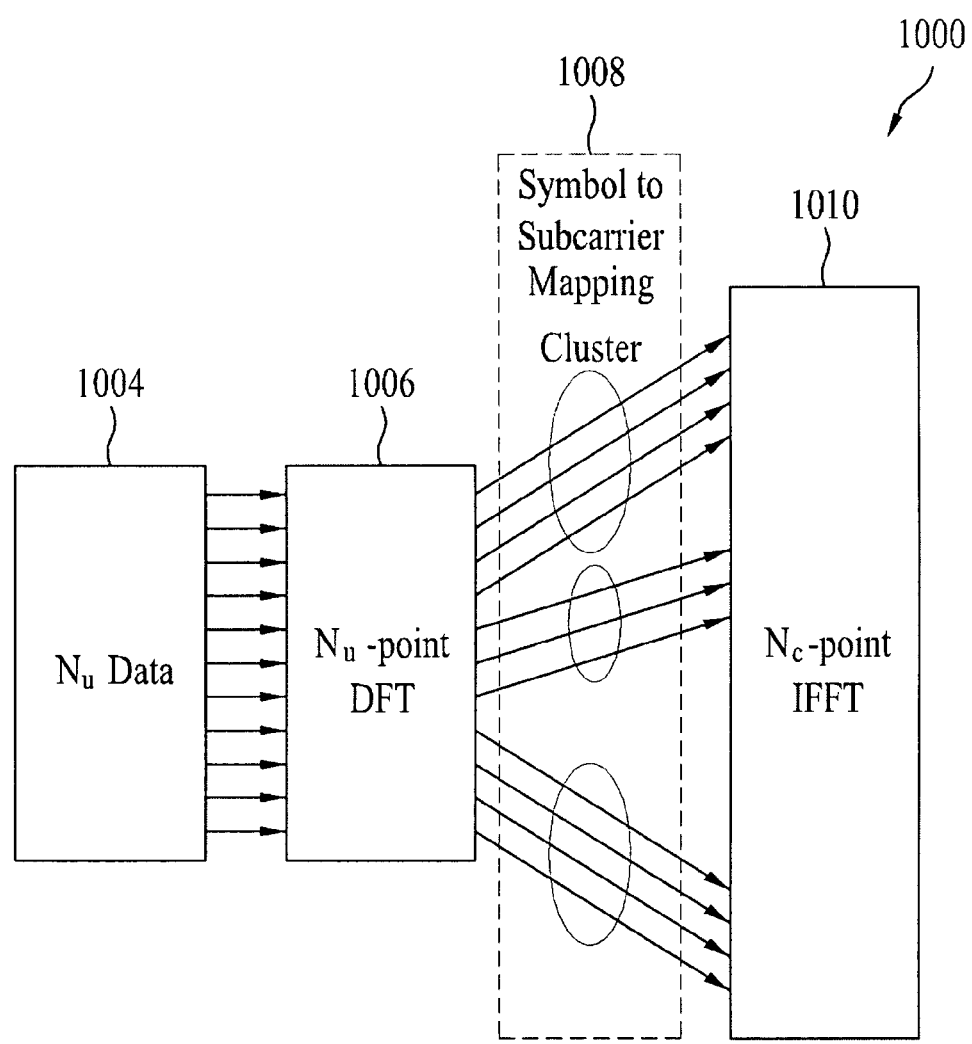
FIG. 10 is a block diagram illustrating an example of a clustered DFT-s-OFDMA transmitter.

FIG. 10 is a block diagram illustrating an example of a clustered DFT-s-OFDMA transmitter. For convenience of description, it is assumed that the transmitter 1000 of FIG. 10 includes a Serial/Parallel (S/P) converter 1004, an $N_u$-point DFT spreading module 1006, a symbol to subcarrier mapping module 1008, and an $N_c$-point IFFT module 1010. Herein, $N_u$ is the number of scheduled subcarriers, and $N_c$ is the total number of subcarriers contained in a system bandwidth (system BW). Referring to FIG. 10, frequency domain sequences generated from the DFT module 1006 are discontinuously mapped to a frequency band at irregular intervals by the symbol to subcarrier mapping module 1008. It can be recognized that the clustered DFT-s-OFDMA scheme of FIG. 10 is implemented when the localized DFT-s-OFDMA scheme is independently applied to a plurality of frequency domains spaced apart from each other. Each frequency band to which the localized DFT-s-OFDMA scheme is applied is referred to as a cluster. The cluster includes one or more consecutive subcarriers. Accordingly, in this scheme of FIG. 10, a plurality of DFT-precoded data symbols are mapped to consecutive subcarriers contained in each of M clusters (M≧1) separated from each other on a frequency axis. FIG. 10 exemplarily shows the case of three clusters. The sizes of respective clusters (i.e., the number of subcarriers) may be equal to each other or may be independently established. If M is equal to or higher than 1, a PAPR value of the transmission signal becomes higher than that of the localized DFT-s-OFDMA scheme. In contrast, if M is set to a specific value within an appropriately small range, a PAPR less than that of the OFDMA scheme is still guaranteed and the flexibility of scheduling can be improved according to the clustered DFT-s-OFDMA scheme of FIG. 10.

Although the DFT-s-OFDMA scheme guarantees a PAPR value less than that of the OFDMA scheme, the DFT-s-OFDMA scheme still has a higher PAPR value as compared to a single carrier system. In order to more quickly transmit much more data, a wireless communication system is evolving into an improved system capable of transmitting and receiving data through a broadband region. For example, although the 3GPP LTE (Release-8) system supports a maximum of 20 MHz bandwidth, a 3GPP LTE-Advanced (Release-9) system for implementing the fourth generation communication is designed to support a maximum of 100 MHz bandwidth. In this way, in the case where a DFT scheme is performed over the entire system bandwidth in a system capable of transmitting and receiving data throughout a broadband region, unexpected problems may occur in complexity of a transmitter. In particular, if the transmitter is used as a user equipment (UE), the importance of a high PAPR and a system complexity greatly increases.

Accordingly, the present invention provides a method for dividing the entire system bandwidth into N subbands (where N>1) in a wireless communication system, performing an independent DFT process on each of the N subbands, and transmitting data through the individual subbands. Although the base station can use the entire system bandwidth, the user equipment (UE) can use only some parts of the entire system bandwidth due to limitations of its capacity or policy. Therefore, the user equipment divides an available system bandwidth into a plurality of subbands. For convenience of description, the system bandwidth and the available system bandwidth may be used together as necessary in embodiments of the present invention, and may be analyzed in consideration of their contexts. Information about respective subbands is shared between a base station and a user equipment.

Preferably, the wireless communication system includes a broadband system. According to embodiments of the present invention, the broadband system may include a system capable of supporting a frequency bandwidth wider than the 20 MHz bandwidth. For example, the broadband system may include a system for supporting a bandwidth of more than 20 MHz and a bandwidth of a maximum of 100 MHz. In addition, the broadband system may include a system for using a plurality of frequency blocks using carrier aggregation. The scope of the broadband system in the present invention is not limited thereto, and may further include the 3GPP LTE-Advanced (Release-9) system and the IEEE 802.16m system.

In the present invention, there is no special limitation in a method for mapping a plurality of data symbol sequences spread over a frequency domain through independent DFT processes to subcarriers. For example, the present invention may use an interleaved DFT-s-OFDMA scheme, a localized DFT-s-OFDMA scheme, a clustered DFT-s-OFDMA scheme, or the like. However, considering the flexibility of scheduling and the system complexity, it is preferable that the clustered DFT-s-OFDMA scheme be used after the lapse of each DFT process. In addition, each independent DFT process may be combined with a correspondent independent IFFT process. That is, an independent DFT/IFFT process is performed in each subband, resulting in the implementation of data transmission. Embodiments to be described later will be described by referring to the clustered DFT-s-OFDMA scheme. For convenience of description, schemes according to embodiments of the present invention may be referred to as a hybrid Nx/clustered DFT-s-OFDMA scheme.

Figure 11:
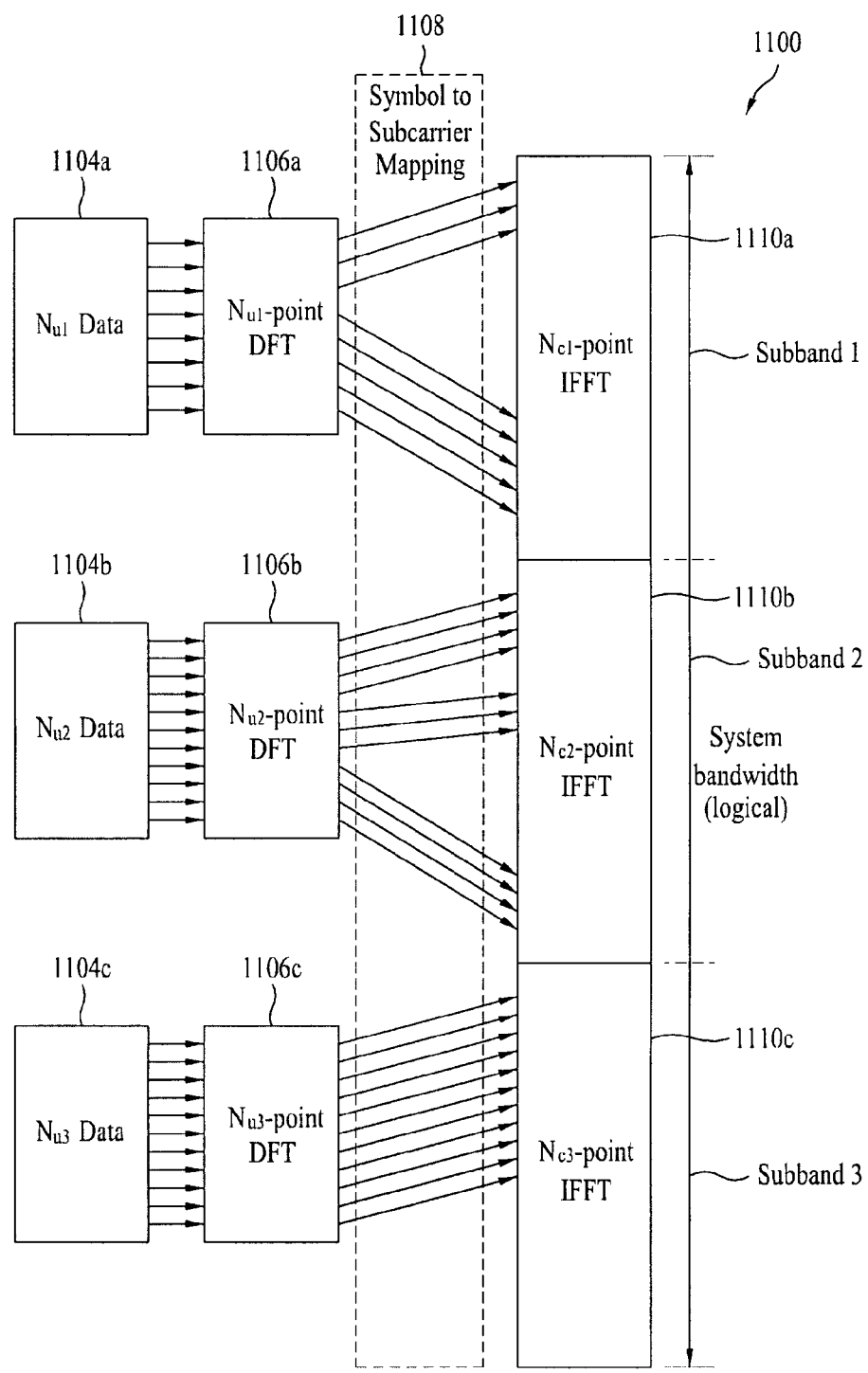
FIG. 11 is a block diagram illustrating an example of a hybrid Nx/clustered DFT-s-OFDMA transmitter in accordance with one embodiment of the present invention.

FIG. 11 is a block diagram illustrating an example of a hybrid Nx/clustered DFT-s-OFDMA transmitter in accordance with one embodiment of the present invention. In FIG. 11, it is assumed that the DFT/IFFT process is applied to each of subbands. For convenience of description, it is assumed that the transmitter 1100 illustrated in FIG. 11 includes serial/parallel (S/P) converters 1104a to 1104c, DFT spreading modules 1106a to 1106c, a symbol to subcarrier mapping module 1108, and IFFT modules 1110a to 1110c.

As shown in FIG. 11, the entire system bandwidth is divided into three subbands. In this case, individual subbands may have the same or different sizes. Each subband includes one or more consecutive subcarriers, and individual subbands may be physically adjacent to each other or be spaced apart from each other. In a wireless communication system based on carrier aggregation, each subband may correspond to each frequency block. In this embodiment of the present invention, an clustered DFT-s-OFDMA scheme is independently applied to each subband. Therefore, the transmitter 1100 requires three DFT processes which are operating independent of each other. For one example, the transmitter 1100 may include three independent DFT modules 1106a to 1106c. For another example, the transmitter 1110 may include DFT modules, the number of which is less than the number of established subbands, and may provide each subband with an independent DFT process by re-using all or some of the DFT modules. The number of subcarriers of each subband may be fixed or be semi-statically established. In this embodiment, it is assumed that the number of subcarriers contained in a first subband (Subband 1) is set to $N_{c1}$, the number of subcarriers contained in a second subband (Subband 2) is set to $N_{c2}$, and the number of subcarriers contained in a third subband (Subband 3) is set to $N_{c3}$. The number of data symbols allocated to respective subbands may be changeable every scheduling time. In this embodiment, it is assumed that the number of data symbols scheduled to a first subband (Subband 1) is set to $N_{u1}$, the number of data symbols scheduled to a second subband (Subband 2) is set to $N_{u2}$, and the number of data symbols scheduled to a third subband (Subband 3) is set to $N_{u3}$.

Referring to the first subband (Subband 1), the first data symbol sequence is converted into $N_{u1}$ parallel data symbols at one time by the S/P converter 1104a. After that, $N_{u1}$ data symbols are spread over a frequency domain by the first DFT module 1106a. The size of the first DFT module 1106a may be equal to $N_{u1}$ indicating the number of input data symbols. The $N_{u1}$-length frequency domain sequences generated from the first DFT module 1106a are mapped to subcarriers of the first subband (Subband 1) by the symbol to subcarrier mapping module 1108. In more detail, the frequency domain sequences are mapped to one or more clusters established in the first subband (Subband 1). If a plurality of clusters are established in the first subband (Subband 1), the positions, sizes, and numbers of respective clusters may be independently established. The clusters are spaced apart from each other on a frequency axis. The size of each cluster may be designated using a basic cluster unit so as to reduce signaling overhead or the like. The basic cluster unit may be decided by a pre-defined resource allocation unit or a multiple thereof. For example, a basic cluster unit may be defined on a basis of a resource block in the 3GPP system. In the 3GPP system, a resource block is defined as (7 or 6 SC-FDMA symbols×12 subcarriers) according to cyclic prefix categories. In the meantime, the size of a basic cluster unit may be decided in consideration of a bandwidth of the first subband (Subband 1). For example, considering the bandwidth of the first subband (Subband 1), the basic cluster unit size may be pre-defined as any one of two resource blocks, four resource blocks, and eight resource blocks. After that, the $N_{c1}-N_{u1}$ remaining subcarriers other than clusters are each padded with '0' in the first subband (Subband 1), information mapped to the first subband (Subband 1) is converted into a first time domain sequence by the $N_{c1}$-point IFFT module 1110a. The first time domain sequence may correspond to a transmission symbol, and is transmitted to a receiver after passing through a cyclic prefix addition process or the like. A transmission symbol is generated at intervals of $N_{u1}$ data symbols, so that one or more first transmission symbols are generated from the first data symbol sequence.

The signal processing in the second subband (Subband 2) or the third subband (Subband 3) is equal to that of the first subband (Subband 1), so that a detailed description of the second and third subbands may refer to that of the first subband (Subband 1). In conclusion, one or more second transmission symbols are generated from the second data symbol sequence in the second subband (Subband 2). One or more third transmission symbols are generated from the third data symbol sequence in the third subband (Subband 3). In the hybrid Nx/clustered DFT-s-OFDMA scheme, data symbols transmitted through respective subbands may belong to different data blocks. Also, data symbols transmitted through some or all subbands contained in the system bandwidth may belong to the same data block. A data block is a minimum data unit which is allocated from a scheduler of the MAC layer to a physical layer at each data transmission time. In the present invention, the MAC layer data block may be used together with a transport block as necessary. A retransmission process of the physical layer may be independently carried out on a basis of a data block. If necessary, one or more data blocks may be collected into one group, so that they may be processed through the same retransmission process.

First to third transmission symbols respectively generated in first to third subbands (Subband 1 to Subband 3) may be transmitted to a receiver using a variety of methods. For example, if the first to third subbands (Subband 1 to Subband 3) are physically adjacent to each other, the first to third transmission symbols may be transmitted to a receiver using one carrier. In more detail, first to third transmission symbols may be processed to neighbor with each other on a frequency axis by a preliminary frequency conversion process, and finally, the resultant first to third transmission symbols may be transmitted to a receiver using one carrier. Another example of such transmission symbols is shown in FIG. 12.

Figure 12:
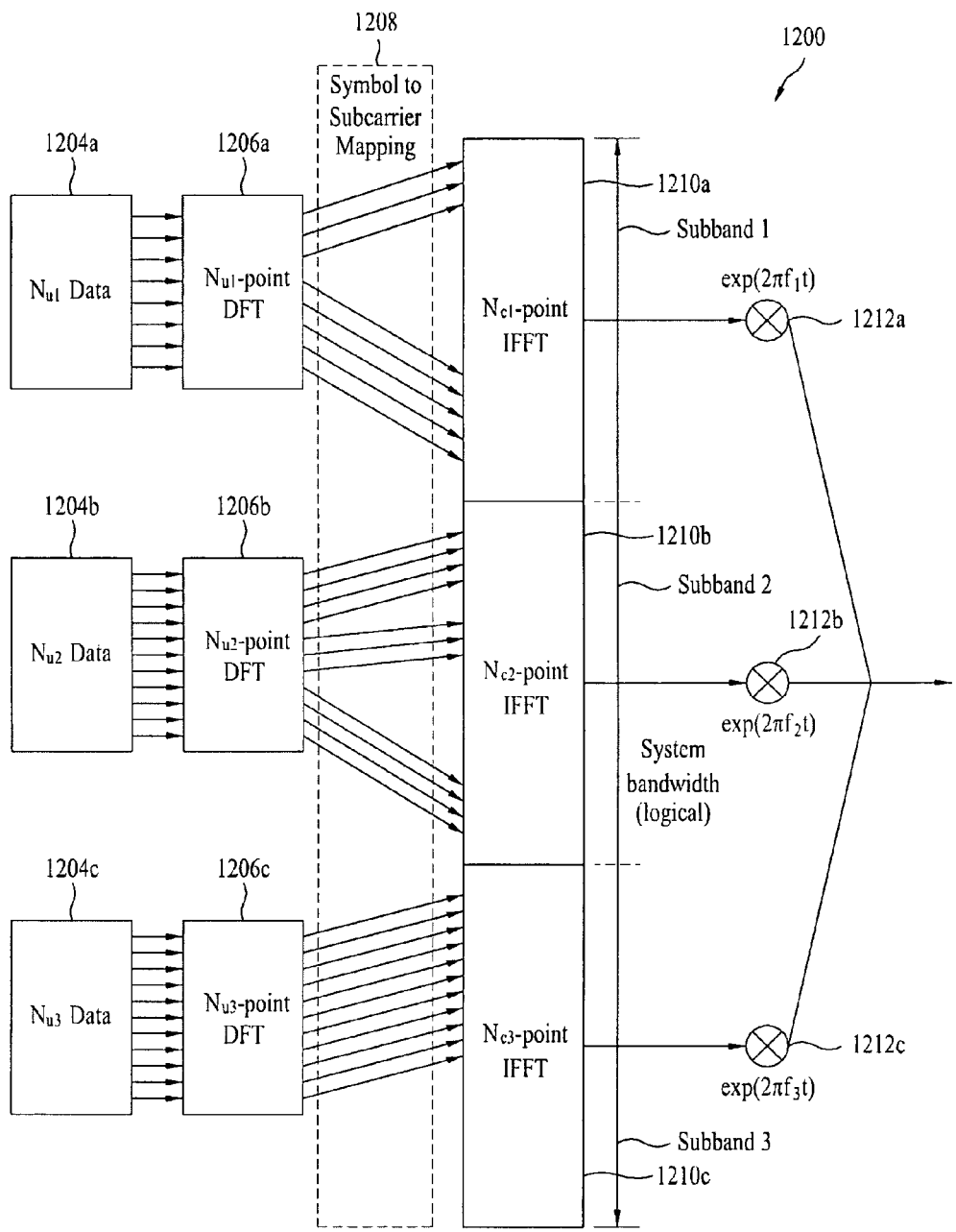
FIG. 12 is a block diagram illustrating an example of a hybrid Nx/clustered DFT-s-OFDMA transmitter in accordance with another embodiment of the present invention.

FIG. 12 is a block diagram illustrating an example of a hybrid Nx/clustered DFT-s-OFDMA transmitter in accordance with another embodiment of the present invention. In FIG. 12, it is assumed that a DFT/IFFT process is applied to each of respective subbands. For convenience of description, it is assumed that the transmitter 1200 of FIG. 12 includes serial/parallel (S/P) converters 1204a to 1204c, DFT modules 1206a to 1206c, a symbol to subcarrier mapping module 1208, and IFFT modules 1210a to 1210c. Compared with FIG. 11, the transmitter 1200 of FIG. 12 includes frequency up-conversion modules 1212a to 1212c for respective subbands. The frequency up-conversion modules 1212a to 1212c may be used as a part of the RF module. The structure of FIG. 12 is basically equal to that of FIG. 11, so that a detailed description of FIG. 12 will refer to FIG. 11.

Differently from FIG. 11, first to third transmission symbols generated in the first to third subbands (Subband 1 to Subband 3) are transmitted to a receiver using different carriers. For example, in the case where subbands are not physically adjacent to each other, first to third transmission symbols may be transmitted to a receiver using different carriers. For another example, in the case where subbands are physically adjacent to each other, the first to third transmission symbols may be transmitted to a receiver using different carriers. In this case, the scheme of FIG. 12 need not perform the preliminary up-conversion process for allowing the first to third transmission symbols to neighbor with each other on a frequency axis.

Figure 13:
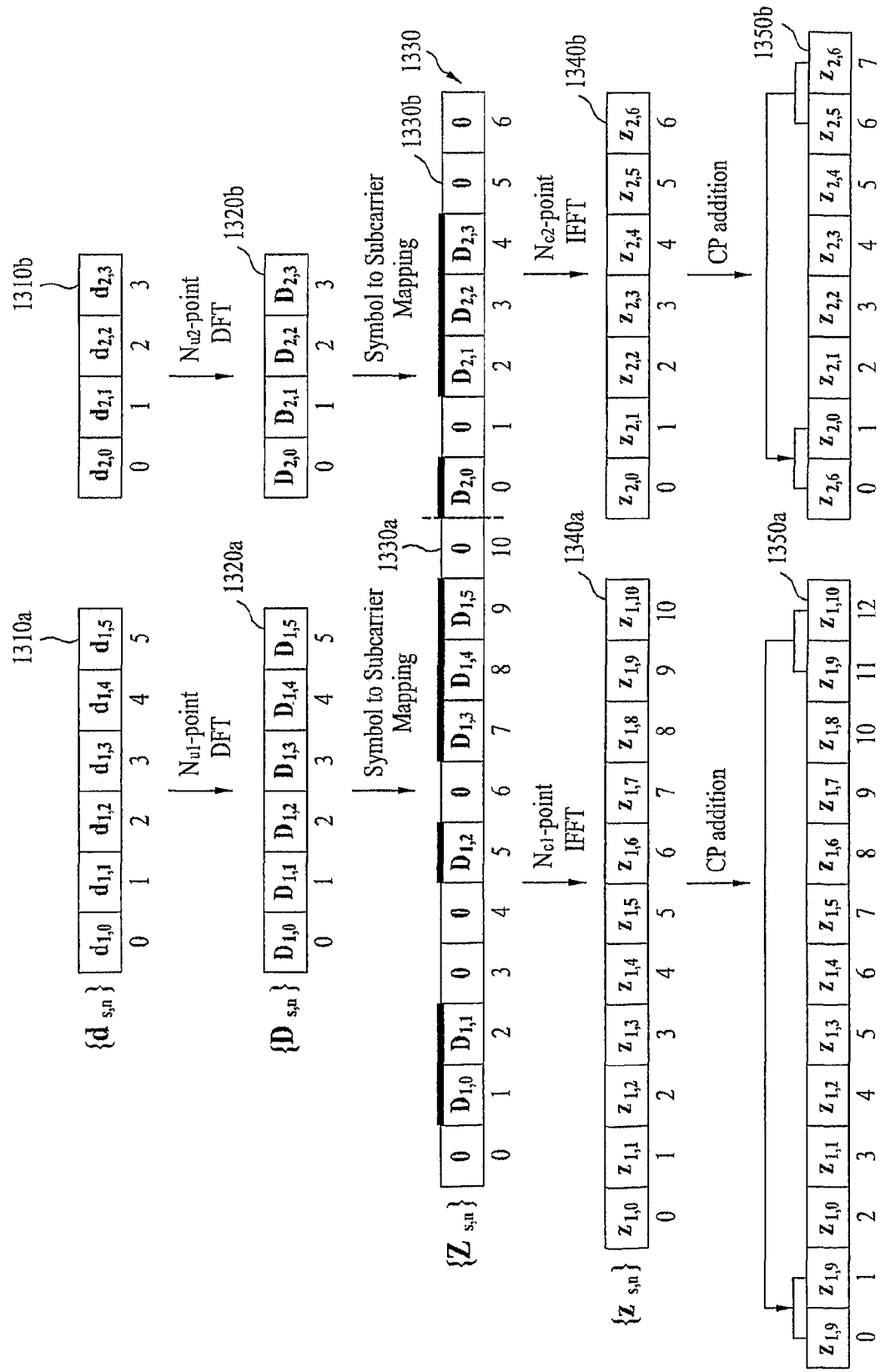
FIG. 13 is a conceptual diagram illustrating a method for processing data symbols using the hybrid Nx/clustered DFT-s-OFDMA transmitter illustrated in FIGS. 11 and 12 in accordance with another embodiment of the present invention.

FIG. 13 is a conceptual diagram illustrating a method for processing data symbols using the hybrid Nx/clustered DFT-s-OFDMA transmitter illustrated in FIGS. 11 and 12 in accordance with another embodiment of the present invention. For convenience of description, only the signal processing about two subbands is shown in FIG. 13, and sequences generated from respective steps are also simply shown in FIG. 13.

Referring to FIG. 13, the signal processing about respective subbands may be simultaneously and parallelly carried out using independent modules. Also, some steps may be repeatedly carried out using the same module. Firstly, a first data symbol sequence based on $N_{u1}$ units is applied to a first DFT module. A second data symbol sequence based on $N_{u2}$ units is applied to a second DFT module. Hereinafter, the data symbol sequences applied to the DFT module are denoted by $\{d_{s,n}\}$. In the following description, 's' is a subband index, and 'n' is a symbol/sequence index. $\{d_{1,n}\}$ 1310a is $N_{u1}$-point DFT-processed, so that $\{d_{1,n}\}$ 1310a is converted into an $N_{u1}$-length first frequency domain sequence. Similarly, $\{d_{2,n}\}$ 1310b is $N_{u2}$-point DFT-processed, so that $\{d_{2,n}\}$ 1310b is converted into an $N_{u2}$-length second frequency domain sequence. Hereinafter, the frequency domain sequence generated from the DFT module is denoted by $\{D_{s,n}\}$. The DFT precoding may be carried out by referring to the method illustrated in FIG. 7A.

After that, the DFT-precoded data symbols are mapped to subcarrier sequences. Hereinafter, a subcarrier sequence for the entire system bandwidth is denoted by $\{Z_n\}$, and a subcarrier sequence for each subband is denoted by $\{Z_{s,n}\}$. $\{Z_n\}$ 1330 is composed of $\{Z_{1,n}\}$ 1330a and $\{Z_{2,n}\}$ 1330b. For convenience of description, a boundary between $\{Z_{1,n}\}$ 1330a and $\{Z_{2,n}\}$ 1330b is denoted by a dotted line as shown in FIG. 13. $\{Z_n\}$ 1330 has the length of $N_c$, where $N_c$ is equal to the number of subcarriers contained in the system bandwidth.

$\{Z_{1,n}\}$ 1330a has the length of $N_{c1}$, where $N_{c1}$ is equal to the number of subcarriers contained in the first subband (Subband 1), and $\{Z_{2,n}\}$ 1330b has the length of $N_{c2}$, where $N_{c2}$ is equal to the number of subcarriers contained in the second subband (Subband 2), as denoted by $N_c=N_{c1}+N_{c2}$. The mapping process is carried out using the clustered DFT-s-OFDMA scheme, and $\{D_{1,n}\}$ 1320a having the length of $N_{u1}$ is mapped to one or more clusters established in $\{Z_{1,n}\}$ 1330a. For convenience of description, each cluster is denoted by a bold line. The $N_{c1}-N_{u1}$ remaining positions other than the bold-lined clusters are each padded with '0'. Similarly, $\{D_{2,n}\}$ 1320b is mapped to clusters contained in $\{Z_{2,n}\}$ 1330b, and the $N_{c2}-N_{u2}$ remaining positions other than the clusters are each padded with '0'.

After that, $\{Z_{1,n}\}$ 1330a is converted into a time domain sequence $\{z_{1,n}\}$ 1340a through one IFFT process, and $\{Z_{2,n}\}$ 1330b is converted into a time domain sequence 1340b through another IFFT process. Thereafter, some samples from {$z_{1,n}$} 1340a or {$z_{2,n}$} 1340b are copied and then added thereto as a cyclic prefix, so that transmission symbols for respective subbands are generated. Respective transmission symbols are transmitted to a receiver after passing through parallel/serial (P/S) conversion, frequency up-conversion process, etc.

Figure 14:
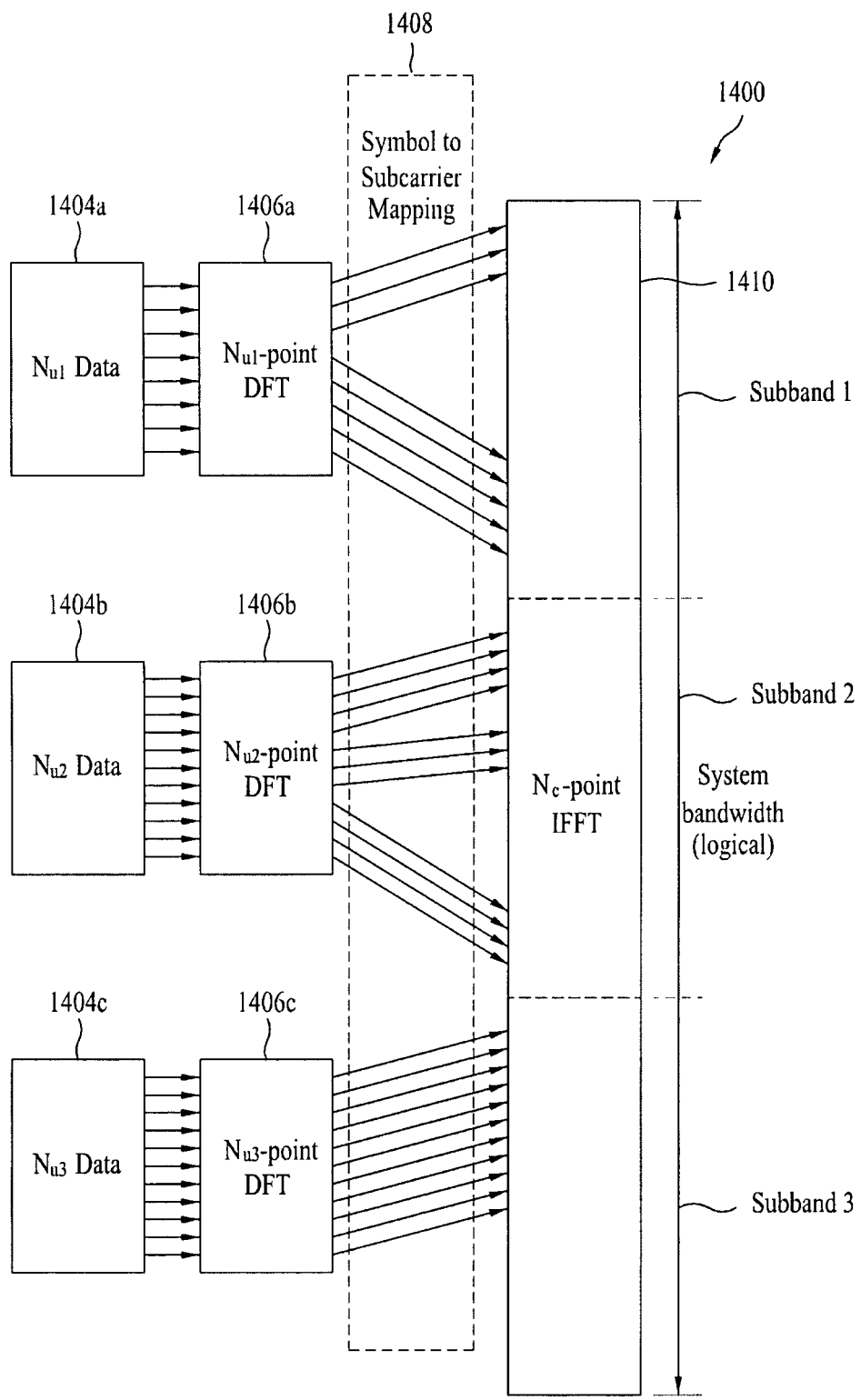
FIG. 14 is a block diagram illustrating another example of a hybrid Nx/clustered DFT-s-OFDMA transmitter in accordance with another embodiment of the present invention.

FIG. 14 is a block diagram illustrating another example of a hybrid Nx/clustered DFT-s-OFDMA transmitter in accordance with another embodiment of the present invention. In FIG. 14, it is assumed that a DFT process is applied to each subband and one IFFT process is applied to the system bandwidth. For convenience of description, it is assumed that the transmitter 1400 includes serial/parallel (S/P) converters 1404a to 1404c, DFT modules 1406a to 1406c, a symbol to subcarrier mapping module 1408, and an IFFT module 1410 in FIG. 14. Compared with FIG. 11, the transmitter 1400 illustrated in FIG. 14 includes only one IFFT module 1410. The above-mentioned modules shown in FIG. 14 are basically equal to those of FIG. 11, so that a detailed description thereof will be described by referring to FIG. 11.

The transmitter 1400 of FIG. 14 performs one IFFT process over a system bandwidth, so that one transmission symbol is generated within the system bandwidth. For reference, in case of FIGS. 11 and 12, an IFFT process is applied to each subband, so that a transmission symbol is generated in each subband. In a time domain, a useful duration of the transmission symbol is decided by a subcarrier spacing. If it is assumed that the same subcarrier spacing is used in FIGS. 11 and 14, the transmission symbol generated in the FIG. 14 has a shorter sampling time in a time domain as compared to that of FIG. 11.

The transmission symbol generated from the IFFT module 1410 may be transmitted to a receiver using one or more carriers according to implementations. For example, if subbands are physically adjacent to each other, the transmission symbol is up-conversion processed at a specific center frequency, and is then transmitted to a receiver. For another example, if subbands are not physically adjacent to each other, a transmission symbol is divided into transmission symbols corresponding to respective subbands using a filter or the like, and then the divided transmission symbols may be transmitted to a receiver using a plurality of carriers.

Figure 15:
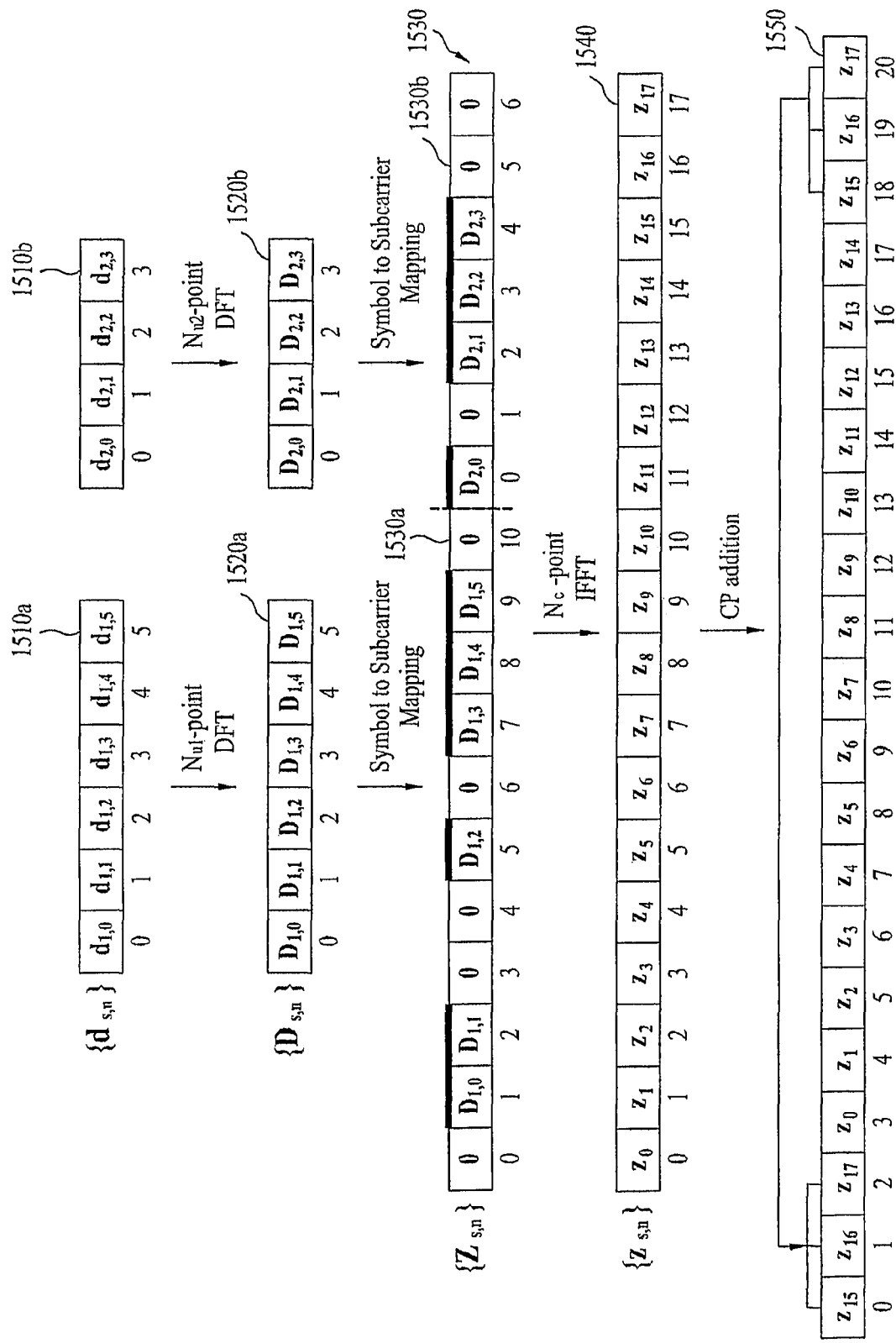
FIG. 15 is a conceptual diagram illustrating a method for processing data symbols using the hybrid Nx/clustered DFT-s-OFDMA transmitter illustrated in FIG. 14 in accordance with another embodiment of the present invention.

FIG. 15 is a conceptual diagram illustrating a method for processing a data symbol using the hybrid Nx/clustered DFT-s-OFDMA transmitter illustrated in FIG. 14 in accordance with another embodiment of the present invention. For convenience of description, FIG. 15 shows only the signal processing about two subbands, and simply shows sequences generated from individual steps. A detailed description of FIG. 15 is basically equal to that of FIG. 13, and as such a detailed description thereof will be described by referring to FIG. 13. Compared with FIG. 13, the IFFT process is not carried out in each subband, but is carried out in the entire system bandwidth in FIG. 15. Accordingly, the entire system bandwidth's sequence corresponding to {$Z_n$} 1530 having the length of $N_c$ is converted into a time domain sequence {$z_n$} 1540a through the IFFT process. After that, some samples from {$z_n$} 1550 are copied and then added thereto as a cyclic prefix, so that a transmission symbol for the entire system bandwidth is generated. If necessary, the generated transmission symbol may be divided into transmission symbols for respective subbands using a filter or the like. After that, the transmission symbols are parallel-to-serial converted, are frequency-up-converted, and the final resultant transmission symbols are transmitted to a receiver.

Figure 16:
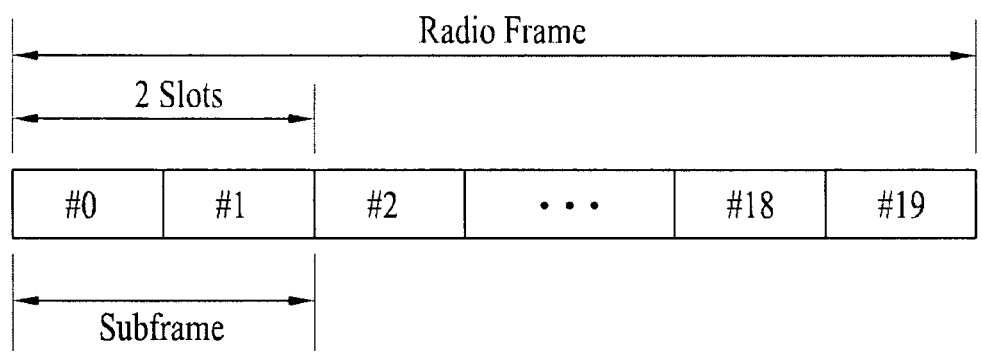
FIG. 16 exemplarily shows a structure of a radio frame.

FIG. 16 exemplarily shows a radio frame.

Referring to FIG. 16, a radio frame includes 10 subframes, and each subframe includes two slots. A duration time required for transmitting each subframe is referred to as a transmission time interval (TTI). For example, the length of each subframe may be set to 1 ms, and the length of each slot may be set to 0.5 ms. Each slot includes a plurality of transmission symbols in a time domain, and includes a plurality of resource blocks in a frequency domain. The above-mentioned radio frame illustrated in FIG. 16 is disclosed only for illustrative purposes, and the number of subframes contained in the radio frame, the number of slots contained in each subframe, and the number of transmission symbols contained in each slot may be changeable in various ways.

Figure 17:
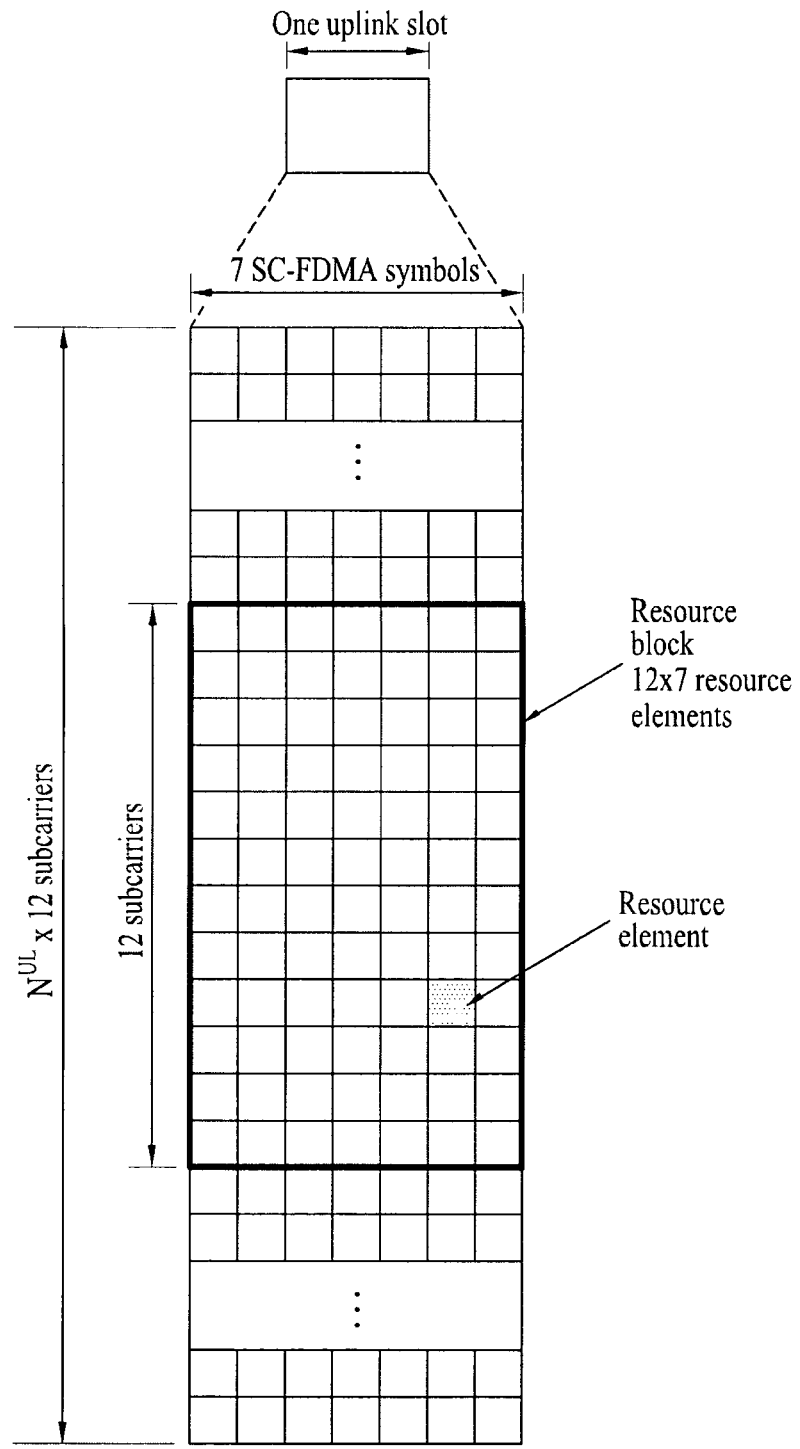
FIG. 17 exemplarily shows a resource grid for a slot.

FIG. 17 exemplarily shows a resource grid for a slot. Although an uplink slot is shown in FIG. 17, the structure of FIG. 17 may also be equally applied to a downlink slot.

Referring to FIG. 17, an uplink slot includes a plurality of SC-FDMA symbols in a time domain, and includes a plurality of resource blocks in a frequency domain. Although an uplink slot includes 7 SC-FDMA symbols and a resource block includes 12 subcarriers as shown in FIG. 17, it should be noted that the scope of the uplink slot and the resource block is not limited thereto. For example, the number of SC-FDMA symbols contained in the uplink slot may be changeable according to the length of a cyclic prefix. Each element on a resource grid is referred to as a resource element. One resource block includes 12×7 resource elements. The number ($N^{UL}$) of resource blocks contained in the uplink slot is subjected to an uplink transmission bandwidth established in a cell.

Figure 18:
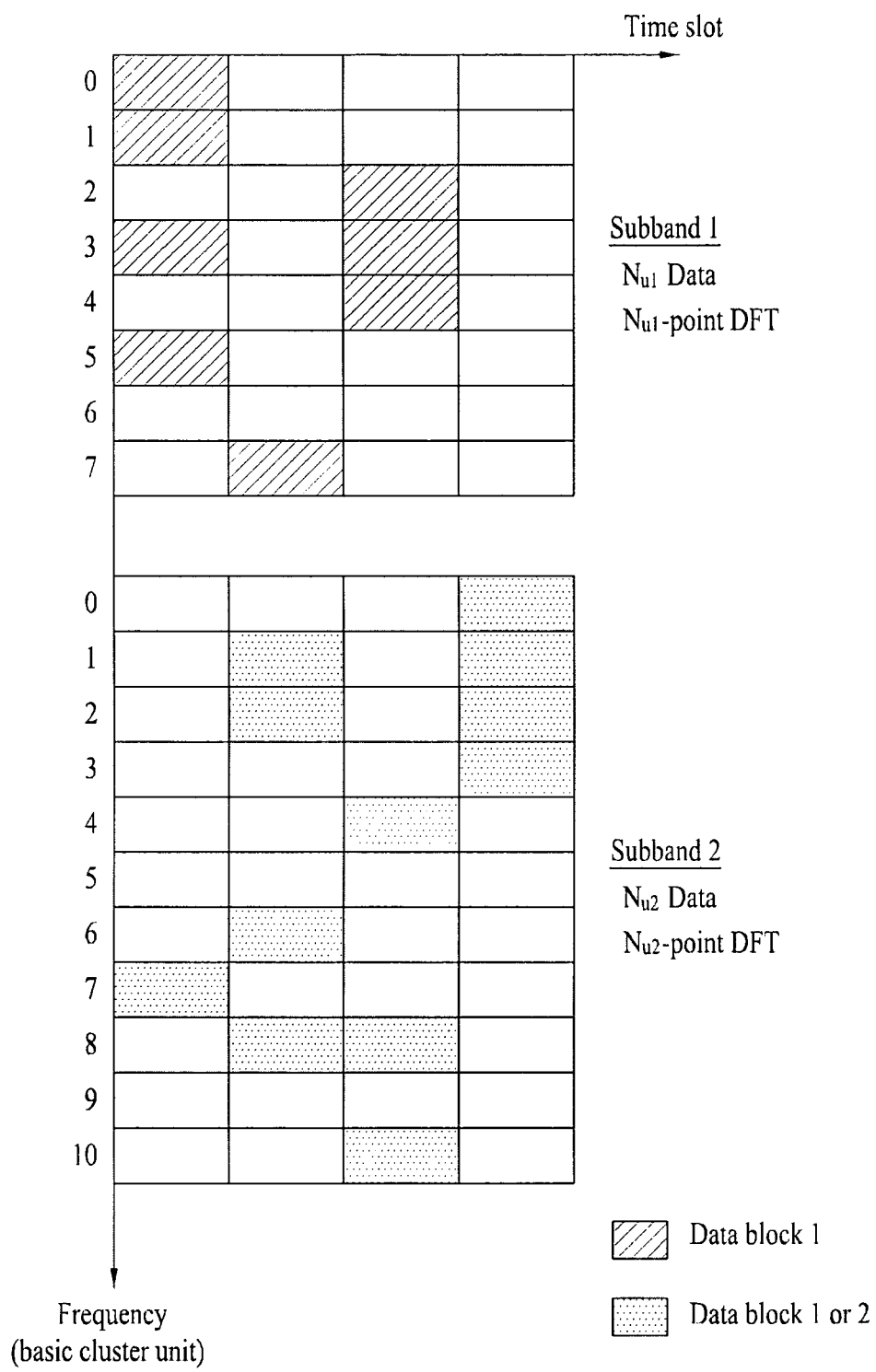
FIG. 18 shows a method for allocating data to a resource region using a hybrid Nx/clustered DFT-s-OFDMA scheme.

FIG. 18 shows a method for allocating data to a resource region using a hybrid Nx/clustered DFT-s-OFDMA scheme. In FIG. 18, a horizontal axis is a time domain and indicates a slot, and a vertical axis is a frequency domain and indicates a basic cluster unit. In FIG. 18, a time slot may be replaced with a subframe. The basic cluster unit is a basic unit for constructing a cluster, and includes one or more neighboring subcarriers. The basic cluster unit may include one or more resource blocks. However, the scope of such a basic cluster unit is not limited thereto, but the basic cluster unit may be defined as two resource blocks, four resource blocks, or eight resource blocks.

Referring to FIG. 18, the system bandwidth includes two subbands. Although a first subband (Subband 1) and a second subband (Subband 2) are spaced apart from each other in FIG. 18, this arrangement of the first and second subbands (Subband 1 and Subband 2) is disclosed only for illustrative purposes, and it should be noted that the first subband (Subband 1) and the second subband (Subband 2) may be adjacent to each other as necessary. The number of subcarriers contained in the first subband (Subband 1) and the number of subcarriers contained in the second subband (Subband 2) are established independent of each other, and may be fixed or be semi-statically changed. The number $N_{u1}$ of data symbols allocated to the first subband (Subband 1) and the number $N_{u2}$ of data symbols allocated to the second subband (Subband 2) may be changeable at each scheduling time. For convenience of description, although only two subbands are exemplarily shown in FIG. 16, it should be noted that the system bandwidth may include many more subbands. In a wireless communication system capable of supporting carrier aggregation, each subband may correspond to each frequency block for such carrier aggregation.

The transmitter performs $N_{u1}$-point DFT precoding on $N_{u1}$ data symbols, and maps generated first frequency domain sequences to clusters of the first subband (Subband 1). Similarly, the transmitter performs $N_{u1}$-point DFT precoding on $N_{u2}$ data symbols, and maps generated second frequency domain sequences to clusters of the second subband (Subband 2). The numbers, sizes, and positions of such clusters may be established independent of each other, and may be changeable at each scheduling time. However, considering system complexity, a PAPR, or the like, the size (i.e., the number of subcarriers) of each cluster contained in the same subband may also be limited.

Referring to the first subband (Subband 1), $N_{u1}$ DFT-precoded data symbols are mapped to three clusters in a first slot, and are mapped to one cluster in a second slot. Referring to the second subband (Subband 2), $N_{u2}$ DFT-precoded data symbols are mapped to one cluster in a first slot, and are mapped to three clusters in a second slot. Data symbols transmitted through the first subband (Subband 1) and the second subband (Subband 2) may belong to different data blocks, or may also belong to the same data block. Preferably, data symbols transmitted through the first subband (Subband 1) and the second subband (Subband 2) belong to different data blocks. For example, if it is assumed that data symbols transmitted through the first subband (Subband 1) belong to a first data block (Data Block 1), data symbols transmitted through the second subband (Subband 2) may belong to a first or second data block (Data Block 1 or 2).

Figure 19:
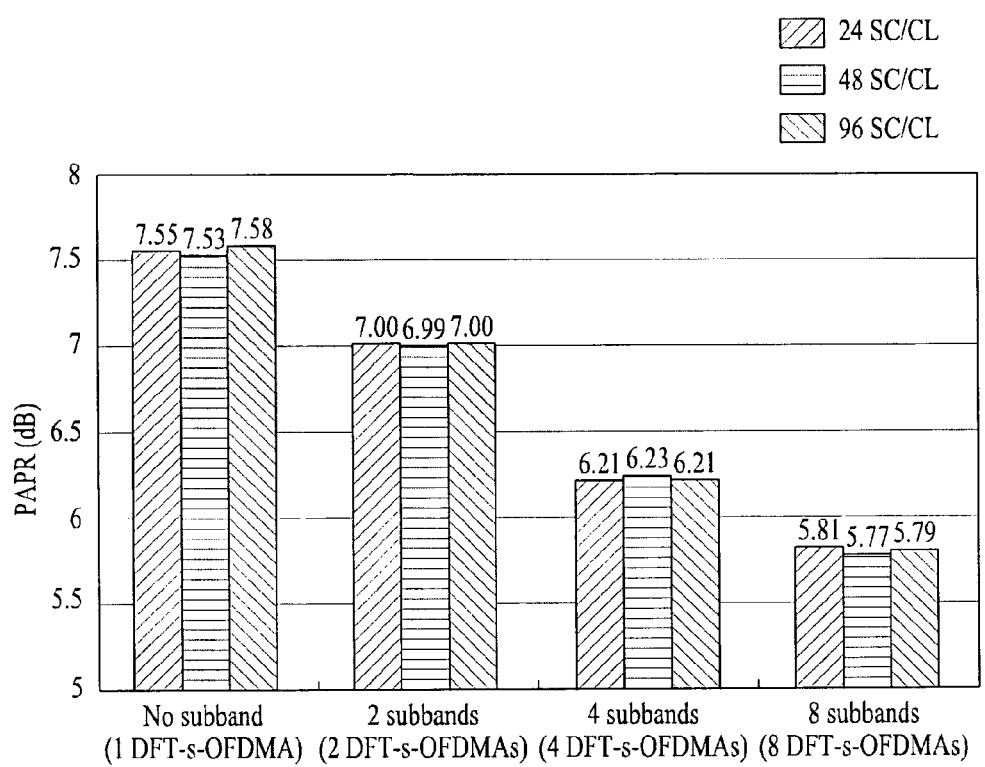
FIG. 19 shows a simulation result for measuring a PAPR in a hybrid Nx/clustered DFT-s-OFDMA scheme.

FIG. 19 shows a simulation result for measuring a PAPR in a hybrid Nx/clustered DFT-s-OFDMA scheme. The system bandwidth includes 2048 subcarriers, and uses QPSK-modulated data symbols. It is assumed that the system bandwidth includes 8 clusters and each of the eight clusters has the same size. In addition, it is assumed that a case in which the system bandwidth is not divided, a case in which the system bandwidth is divided into two equal subbands, a case in which the system bandwidth is divided into four equal subbands, and a case in which the system bandwidth is divided into eight equal subbands are used in FIG. 19. DFT-s-OFDMA process is independently processed in each subband. The simulation result is shown in the following Table 1.

TABLE 1

|  | No subband | 2 subbands | 4 subbands | 8 subbands |
|---|---|---|---|---|
| 24 SC/CL (8 CLs) | 7.55 dB (100%) | 7.00 dB (92.72%) | 6.21 dB (82.25%) | 5.81 dB (76.96%) |
| 48 SC/CL (8 CLs) | 7.53 dB (100%) | 6.99 dB (92.83%) | 6.23 dB (82.74%) | 5.77 dB (76.63%) |
| 96 SC/CL (8 CLs) | 7.58 dB (100%) | 7.00 dB (92.35%) | 6.21 dB (81.93%) | 5.79 dB (76.39%) |

In Table 1, 'SC/CL' means 'subcarrier/cluster'.

Referring to Table 1, PAPR is not greatly affected by the number of subcarriers contained in a cluster, and is affected by the number of clusters capable of being simultaneously processed by the DFT-s-OFDMA process. In other words, in the case where the system bandwidth is processed by one DFT-s-OFDMA process, the number of clusters increases, resulting in a deterioration of PAPR. In particular, considering that a PAPR generally converges in the range of about 8 dB at a reliability level of 95% according to the OFDMA scheme, it can be recognized that if the system bandwidth is not divided, PAPR gain is slight considering that of the OFDMA scheme.

Accordingly, because the number of available clusters capable of being used for resource allocation is limited in the conventional method, it is impossible for the conventional method to perform flexible scheduling. In contrast, in the case where the entire system bandwidth is divided into a plurality of subbands, and a DFT-s-OFDMA process is performed in each subband, the number of clusters to be processed is reduced, and thus a PAPR is also largely reduced. In more detail, PAPRs generated when the system bandwidth is divided into two, four and eight subbands are less than PAPR generated when system bandwidth is not divided by a maximum of 7.65%, 12.07%, and 23.61%. In particular, if it is assumed that a PAPR based on the OFDMA scheme is 8 dB, PAPRs acquired from embodiments of the present invention correspond to 87.38%, 77.63%, and 72.12% of the above OFDMA-based PAPR, respectively, so that it can be recognized that a PAPR gain is considerable. Accordingly, the present invention can simultaneously provide a low PAPR and the flexible scheduling using the hybrid Nx/clustered DFT-s-OFDMA scheme.

Figure 20:
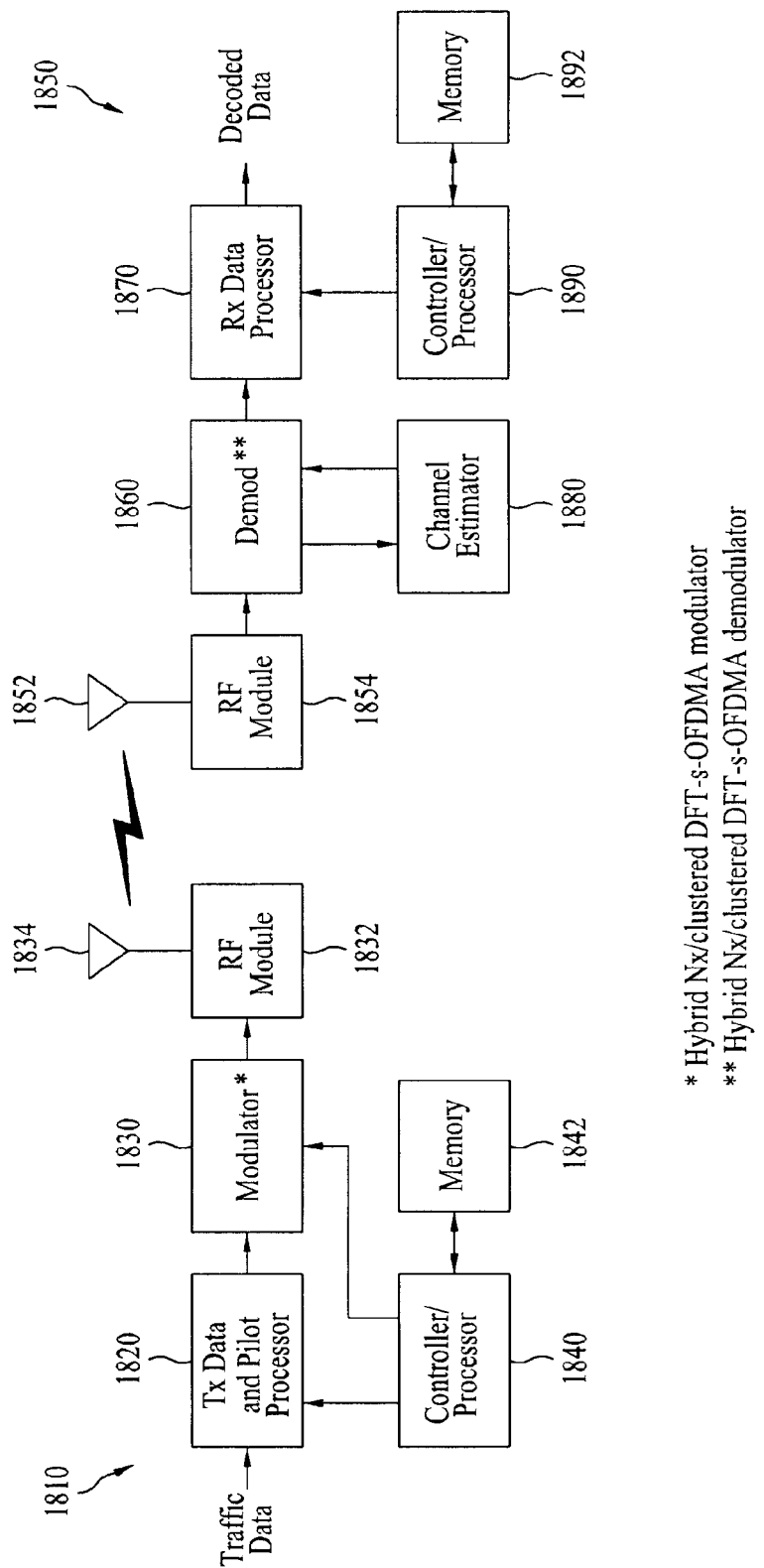
FIG. 20 is a block diagram illustrating a transmitter and a receiver according to one embodiment of the present invention.

FIG. 20 is a block diagram illustrating a transmitter and a receiver according to the present invention. In a downlink, a transmitter 1810 is used as a part of a base station, and a receiver 1850 is used as a part of a user equipment (UE). In an uplink, a transmitter 1810 is used as a part of a user equipment (UE), and is used as a part of a base station.

Referring to FIG. 20, in the transmitter 1810, a transmission (Tx) data and pilot processor (Tx Data and Pilot Processor) 1820 encodes data (for example, traffic data and signaling), interleaves the encoded data, and performs symbol mapping on the interleaved data, thus generating data symbols. The processor 1820 generates pilot symbols, so that it multiplexes the data symbols and the pilot symbols. As can be seen from the embodiments of the present invention, the data symbol is a modulation symbol for data, and the pilot symbol is a modulation symbol for a pilot. The modulation symbol may be represented by a real number or complex number about one point contained in a constellation. A hybrid Nx/clustered DFT-s-OFDMA modulator 1830 generates transmission symbols using the processes illustrated in FIGS. 11 to 15. A radio frequency (RF) module 1832 performs a variety of processes (e.g., analogue conversion, amplifying, filtering, and frequency-up conversion) on the transmission symbols, thus generating an RF signal to be transferred through an antenna 1834. In the receiver 1850, an antenna 1852 receives a signal transferred from the transmitter 1810, and provides the RF module 1854 with the received signal. The RF module 1854 performs a variety of processes (e.g., filtering, amplifying, frequency-down conversion, and digitalizing) on the received signal, and provides input samples. A hybrid Nx/clustered DFT-s-OFDMA demodulator 1860 demodulates input samples (e.g., inverse processes of FIGS. 11 to 15) and provides data values and pilot values using the demodulated input samples. A channel estimator 1880 derives a channel estimation value from the received pilot values. The hybrid Nx/clustered DFT-s-OFDMA demodulator 1860 detects (or equalizes) received data values using the channel estimation value, and provides data symbol estimation values for the transmitter 1810. A reception (Rx) data processor 1870 performs symbol demapping, de-interleaving, and decoding on data symbol estimation values, and provides decoded data. Generally, the hybrid Nx/clustered DFT-s-OFDMA demodulator 1860, and the Rx data processor 1870 in the receiver 1850 are complementary to the hybrid Nx/clustered DFT-s-OFDMA demodulator 1830, and the Tx Data and Pilot processor 1820 in the transmitter 1810.

Controller/Processor 1840 controls and manages operations of a variety of processing modules in the transmitter 1810, and Controller/Processor 1890 controls and manages operations of a variety of processing modules in the receiver 1850. A memory 1842 stores program codes and data for the transmitter 1810, and a memory 1892 program codes and data for the receiver 1850.

The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/ or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicit cited relation in the appended claims or may include new claims by amendment after application.

The above-mentioned embodiments of the present invention have been disclosed on the basis of a data communication relationship between a base station and a terminal. Specific operations to be conducted by the base station in the present invention may also be conducted by an upper node of the base station as necessary. In other words, it will be obvious to those skilled in the art that various operations for enabling the base station to communicate with a terminal in a network composed of several network nodes including the base station will be conducted by the base station or other network nodes other than the base station. The term 'Base Station' may be replaced with a fixed station, Node-B, eNode-B (eNB), or an access point as necessary. The term 'terminal' may be replaced with a user equipment (UE), a mobile station (MS) or a mobile subscriber station (MSS) as necessary.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered for only illustrative purposes instead of restrictive purposes. The scope of the present invention must be decided by a rational analysis of claims, and all modifications within equivalent ranges of the present invention are contained in the scope of the present invention.

[Industrial Applicability]

The present invention is applicable to a wireless communication system. In more detail, the present invention can be applied to a wireless communication system for supporting at least one of SC-FDMA, MC-FDMA, and OFDMA. In more detail, the present invention is applicable to a radio access method for reducing a PAPR in the above-mentioned wireless communication system.

The invention claimed is:

1. A method for transmitting radio signals by a communication apparatus in a wireless communication system, the method comprising:
   configuring plural subbands within an overall frequency resources;
   generating each of plural frequency domain sequences from each of plural data symbol sequences by performing a Fourier transform process in each of the plural subbands;
   independently mapping each of the plural frequency domain sequences to one or more clusters in each of the plural subbands, each cluster consisting of consecutive subcarriers;
   generating each of plural time domain sequences from each of the mapped plural frequency domain sequences through one or more inverse Fourier transform processes; and
   transmitting each of plural radio signals, each radio signal including each of the plural time domain sequences.

2. The method according to claim 1, wherein at least two or more of the plural subbands are logically adjacent to each other, but are physically spaced apart from each other.

3. The method according to claim 1, wherein the respective subbands use different center carriers.

4. The method according to claim 1, wherein each of the plural data symbol sequences is converted into each of the plural frequency domain sequences through an independent Discrete Fourier Transformation (DFT), and each DFT size is equal to a length of input data symbol sequences.

5. The method according to claim 1, wherein each of the plural data symbol sequences is derived from each of plural Medium Access Control (MAC) layer data blocks.

6. The method according to claim 1, wherein, clusters in a subband are spaced apart from each other on a frequency axis.

7. The method according to claim 1, wherein the size of the cluster is set to a multiple of a basic unit for resource allocation.

8. A communication apparatus for transmitting radio signals in a wireless communication system, the apparatus comprising:
   a radio frequency (RF) module; and
   a processor,
   wherein the processor is configured to:
      configure plural subbands within an overall frequency resources;
      generate each of plural frequency domain sequences from each of plural data symbol sequences by performing a Fourier transform process in each of the plural subbands;
      independently map each of the plural frequency domain sequences to one or more clusters in each of the plural subbands, each cluster consisting of consecutive subcarriers;
      generate each of plural time domain sequences from each of the mapped plural frequency domain sequences through one or more inverse Fourier transform processes; and
      transmit each of plural radio signals, each radio signal including each of the plural time domain sequences.

9. The communication apparatus of claim 8, wherein at least two or more of the plural subbands are logically adjacent to each other, but are physically spaced apart from each other.

10. The communication apparatus of claim 8, wherein the respective subbands use different center carriers.

11. The communication apparatus of claim 8, wherein each of the plural data symbol sequences is converted into each of the plural frequency domain sequences through an independent Discrete Fourier Transformation (DFT), and each DFT size is equal to a length of input data symbol sequences.

12. The communication apparatus of claim 8, wherein each of the plural data symbol sequences is derived from each of plural Medium Access Control (MAC) layer data blocks.

13. The communication apparatus of claim 8, wherein, clusters in a subband are spaced apart from each other on a frequency axis.

14. The communication apparatus of claim 8, wherein the size of the cluster is set to a multiple of a basic unit for resource allocation.

* * * * *